US012654390B2

(12) United States Patent
Dorini et al.

(10) Patent No.: US 12,654,390 B2
(45) Date of Patent: Jun. 16, 2026

(54) METHODS OF MANUFACTURE OF THREE-DIMENSIONAL OBJECTS AND CONTROLLER AND APPARATUS THEREFOR

(71) Applicant: Stratasys Powder Production Ltd., London (GB)

(72) Inventors: Gianluca Dorini, London (GB); Anders Hartmann, London (GB); Neil Hopkinson, London (GB); Frederik Tjellesen, London (GB)

(73) Assignee: Stratasys Powder Production Ltd., London (GB)

( * ) Notice: Subject to any disclaimer, the term of this patent is extended or adjusted under 35 U.S.C. 154(b) by 415 days.

(21) Appl. No.: 18/546,734

(22) PCT Filed: Sep. 13, 2021

(86) PCT No.: PCT/GB2021/052368
§ 371 (c)(1),
(2) Date: Aug. 16, 2023

(87) PCT Pub. No.: WO2022/180347
PCT Pub. Date: Sep. 1, 2022

(65) Prior Publication Data
US 2024/0157632 A1 May 16, 2024

(30) Foreign Application Priority Data
Feb. 25, 2021 (GB) ...................................... 2102732

(51) Int. Cl.
*B29C 64/153* (2017.01)
*B29C 64/236* (2017.01)
(Continued)

(52) U.S. Cl.
CPC .......... *B29C 64/153* (2017.08); *B29C 64/236* (2017.08); *B29C 64/277* (2017.08);
(Continued)

(58) Field of Classification Search
CPC ... B29C 64/153; B29C 64/236; B29C 64/277; B29C 64/295; B29C 64/393;
(Continued)

(56) References Cited

U.S. PATENT DOCUMENTS

2016/0339519 A1* 11/2016 Sargent ................... B22F 10/36
2020/0130263 A1 4/2020 Günther et al.
(Continued)

FOREIGN PATENT DOCUMENTS

GB 2568518 A 5/2019
GB 2579638 A 7/2020
(Continued)

*Primary Examiner* — Michael J Brown
(74) *Attorney, Agent, or Firm* — HONIGMAN LLP; Eric J. Sosenko; Jonathan P. O'Brien

(57) ABSTRACT

A controller and method for layer-by-layer manufacturing of a three-dimensional object from a powder. The method includes, in a first direction across a build area: moving a droplet deposition unit and depositing a radiation absorber onto regions of a previously applied layer of powder; moving a first radiation source according to a first velocity profile whilst activating the first radiation source to fuse the regions of powder where the absorber has been deposited; moving a powder distributor according to a second velocity profile and distributing a fresh layer of powder; and moving a second radiation source whilst activating the second radiation source to preheat the fresh layer of powder. The method further includes adjusting the first and/or second velocity profiles to control a time interval between the passing of the first radiation source and the powder distributor.

19 Claims, 9 Drawing Sheets

(51) Int. Cl.

| | |
|---|---|
| *B29C 64/277* | (2017.01) |
| *B29C 64/295* | (2017.01) |
| *B29C 64/393* | (2017.01) |
| *B33Y 10/00* | (2015.01) |
| *B33Y 50/02* | (2015.01) |
| *B29C 64/386* | (2017.01) |
| *B33Y 50/00* | (2015.01) |

(52) U.S. Cl.
CPC .......... *B29C 64/295* (2017.08); *B29C 64/393* (2017.08); *B33Y 10/00* (2014.12); *B33Y 50/02* (2014.12)

(58) Field of Classification Search
CPC ... B29C 64/165; B29C 64/264; B29C 64/386; B33Y 10/00; B33Y 50/02; B33Y 30/00; B33Y 50/00; Y02P 10/25
USPC .......................................................... 700/98
See application file for complete search history.

(56) References Cited

U.S. PATENT DOCUMENTS

| 2020/0338817 A1* | 10/2020 | Murciego Rodriguez .................. B29C 64/241 |
|---|---|---|
| 2020/0398482 A1 | 12/2020 | Tjellesen et al. |
| 2022/0024124 A1* | 1/2022 | Tjellesen ............... B22F 12/67 |

FOREIGN PATENT DOCUMENTS

| GB | 2579639 A | 7/2020 |
|---|---|---|
| GB | 2584493 A | 12/2020 |
| WO | 2019/143346 A1 | 7/2019 |
| WO | 2020/115492 A1 | 6/2020 |
| WO | 2020/237166 A1 | 11/2020 |

* cited by examiner

| Layout | Carriage 30_2 | | | | | | Carriage 30_1 | | | | | Arrangement |
|---|---|---|---|---|---|---|---|---|---|---|---|---|
| | | | Powder Distributor 36 | | | | | | Droplet deposition unit 38 | | | |
| 6(i) | | L2 | | | | | | L1 | | | | Figure 7 |
| 6(ii) | | L2 | | L4 | | | | L1 | | | | Figure 7 |
| 6(iii) | | L2 | | | | | L3 | L1 | | | | Figure 9 |
| 6(iv) | | L2 | | | | | L3 | L1 | | | | Figure 9 |
| 6(v) | | L2 | | L4 | | | L1 | L3 | | | | Figure 9 |
| 6(vi) | | L2 | | L4 | | | L3 | L1 | | | | Figure 9 |
| 6(vii) | | L2 | | L4 | | | L3 | L1 | | | | Figure 9 |
| 6(viii) | L4 | L2 | | | | | | L1 | | | | Figure 8 |
| 6(ix) | L4 | L2 | | | | | L3 | L1 | | | | Figure 10 |
| 6(x) | L4 | L2 | | | | | L3 | L1 | | | | Figure 10 |
| 6(xi) | L4 | L2 | | | | | L1 | L3 | | | | Figure 10 |
| 6(xii) | L4 | L2 | | | | | | L1 | | L3 | | Figure 8 |
| 6(xiii) | | L2 | | | | | | L1 | | L3 | | Figure 7 |
| 6(xiv) | | L2 | | L4 | | | | L1 | | L3 | | Figure 7 |
| 6(xv) | | | | L2 | L4 | | | L1 | | L3 | | Figure 11 |

FIRST DIRECTION (L-R)

SECOND DIRECTION (R-L)

METHODS OF MANUFACTURE OF THREE-DIMENSIONAL OBJECTS AND CONTROLLER AND APPARATUS THEREFOR

FIELD OF INVENTION

The present disclosure relates methods for the layer-by-layer formation of three-dimensional (3D) objects, and a controller and apparatus to apply the methods. More particularly, the disclosure relates to methods for use in powder-based manufacturing of 3D objects, and a controller and apparatus to apply the methods.

BACKGROUND

Apparatus for the manufacture of 3D objects on a layer-by-layer basis, and utilising various powder-based methods, such as selective laser sintering and high speed sintering, are known. Such powder-based methods comprise a series of steps for each layer sequence, including distributing a layer of powder; and sintering, or fusing, the powder in accordance with image data for that layer of the 3D object to be built. A subsequent layer of powder is distributed, and the steps are repeated until the 3D object is complete and the unfused powder surrounding the fused object is removed.

In high speed sintering type processes, fusion of the material is achieved by providing a radiation absorbing material (RAM), for example via a fluid deposited by a droplet deposition head, to the regions of the layer of build material in the form of a pattern, and exposing the layer to radiation from a radiation source. The regions containing the radiation absorber preferentially absorb radiation from the radiation source and heat up sufficiently to fuse, leaving other regions not containing radiation absorber unfused. During a typical process sequence to complete one layer of the object, the build area undergoes a thermal cycle, fluctuating between a higher temperature band at or near the fusing state of the layer sequence, and a lower temperature band at or near the event of distributing a fresh layer of powder.

It is generally desirable to provide a rapid process sequence to enhance the commercial competitiveness of the process. Thus efforts have been made to reduce the duration of a layer sequence by utilising both forward and return passes of radiation source(s) and/or powder distributor(s) over the build area; i.e. in opposite directions. Often such efforts overlook or compromise on considerations that involve the thermal cycle of the layer.

Improved methods are therefore needed that include balancing these considerations between different points on the build area over a layer sequence. When designing a layer sequence, often an important consideration which conflicts with the need for thermal uniformity is the requirement for rapid processing to achieve a competitive manufacturing process. New processes and layouts supporting these processes are therefore required to fulfil the need for controlled thermal uniformity without significantly impacting process speed.

SUMMARY

The present disclosure provides improved methods and apparatus for manufacturing a 3D object. Aspects of the invention are set out in the appended independent claims, while details of particular embodiments are set out in the appended dependent claims.

According to a first aspect of the invention, a method for layer-by-layer manufacturing of a 3D object from a powder is provided, wherein a droplet deposition unit, a first radiation source, a powder distributor and a second radiation source are moveably provided over a working surface, the working surface comprising a build area on which the object is formed layer-by-layer, the method comprising, in a first direction across a plurality of locations on the build area: (a) moving the droplet deposition unit and depositing, using a droplet deposition unit, a radiation absorber onto regions of a previously applied layer of powder distributed across a build area; (b) moving the first radiation source according to a first velocity profile whilst activating the first radiation source to apply fusing energy to the build area to fuse the regions of powder where the absorber has been deposited; (c) moving the powder distributor according to a second velocity profile and distributing a fresh layer of powder over the build area; and (d) moving the second radiation source whilst activating the second radiation source to apply energy to preheat the fresh layer of powder; wherein the method further comprises adjusting the first and/or second velocity profiles to control a time interval $\Delta t$ between the passing of the first radiation source and the powder distributor at each of the plurality of locations.

In a second aspect of the invention, there is provided a controller for an apparatus for manufacturing a 3D object from a powder, using the method according to the first aspect of the invention.

In a third aspect of the invention, there is provided an apparatus for layer-by-layer manufacturing a 3D object from a powder, the apparatus comprising: a working surface, the working surface comprising a build area on which the object is formed layer-by-layer; and a droplet deposition unit, a first radiation source, a powder distributor and a second radiation source operable to move across the working surface in a first direction, and in a second direction opposite to the first direction, to pass over a plurality of locations on the build area, wherein: the droplet deposition unit is operable to deposit radiation absorber onto regions on the build area as the droplet deposition unit moves according to a first velocity profile $v1(t)$ in the first direction; the first radiation source being provided in the second direction with respect to the droplet deposition unit; the first radiation source is provided behind the droplet deposition unit in the first direction and is operable to fuse the regions on the build area previously deposited with radiation absorber as the first radiation source moves according to a first velocity profile $v1(t)$ in the first direction; the powder distributor is operable to distribute a fresh layer of powder as the powder distributor moves across the build area according to a second velocity profile $v2(t)$ in the first direction; and the second radiation source is operable to preheat the freshly distributed layer of powder as the second radiation source moves across the build area in the first direction; the apparatus further comprising a controller arranged to adjust the first and/or second velocity profiles to control a time interval $\Delta t$ between the passing of the first radiation source and the powder distributor at each of the plurality of locations.

BRIEF DESCRIPTION OF THE DRAWINGS

Embodiments will now be described by way of non-limiting examples, with reference to the accompanying Figures of which.

In the figures, like elements are indicated by like reference numerals throughout.

DETAILED DESCRIPTION

In the following, a radiation source operable to 'fuse' is operated at an energy output capable of raising the temperature of the regions on the build area onto which radiation absorber has been deposited. The temperature is raised sufficiently to reach or exceed the temperature of fusion, such that fusion of the regions may be achieved. By contrast a radiation source operable to 'preheat' is operated at a comparatively lower energy output and/or a different wavelength, capable of raising the temperature of the build area and/or the regions onto which absorber has been deposited, but not sufficiently to reach or exceed the temperature of fusion.

Embodiments and their variants will now be described, examples of which are illustrated with reference to the accompanying drawings.

Figure 1:
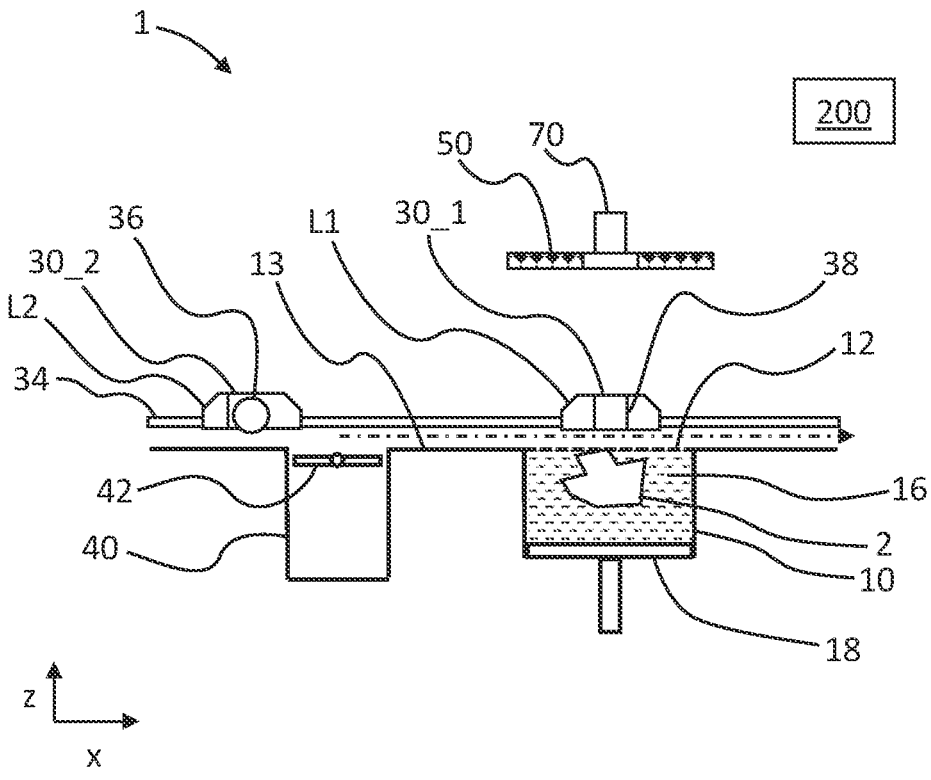
FIG. 1 schematically illustrates a cross-sectional front view of an apparatus for the manufacture of 3D objects.

FIG. 1 schematically illustrates a front view of an apparatus 1 for the manufacture of 3D objects. The apparatus 1 is operable to fabricate 3D objects layer-by-layer from powder and includes a work surface 13 comprising a build area 12 provided at the top of a build bed 16. The build bed 16 is supported on a chamber floor 18 moveable in the layering direction z within a build chamber 10. In the build chamber 10, successive layers of the 3D object are formed and together form the build bed 16. Two carriages 30_1, 30_2 are movably arranged so as to traverse the work surface 13 and the build area 12 along a first direction and a second direction opposite the first direction. For illustrative purposes the directions of movement will be referred to herein as the "first direction", from left to right (L-R), or along the x-axis, and the second direction, from right to left (R-L), where references to "left" and "right" herein are merely for ease of understanding with respect to the drawings, and it will be appreciated that mirror-image versions of the present apparatus and methods can be made in which the concepts of "left" and "right" are reversed.

The carriages may be mounted on common rails 34 as shown. The first carriage is provided with a first radiation source L1 and, in the apparatus shown, also with a droplet deposition unit 38. The second carriage 30_2 is provided with a powder distributor 36 operable to distribute a layer of powder within the build area 12, and with a second radiation source L2. In the apparatus shown, the powder is dosed from below the work surface 13 from a powder dosing module 40 by a rotatable dosing device 42. Ahead of the step of distributing a new layer of powder, the powder distributor device 36 is moved in the second direction so as to be to the left of the dosing device 42. This ensures that there is clearance for the dosing device 42 to dose a pile of powder from the dosing module 40 to the work surface 13 ahead of the powder distributor 38. The dosing device 42 is here exemplified in the form of a rotating blade. The first carriage 30_1 meanwhile is located to the right of the second carriage 30_2. The dosing device 42 doses a fresh pile of powder to the work surface 13, and the powder distributor 36, here shown as a roller 36, is moved across the work surface 13 by moving the second carriage 30_2 in the first direction and across the build bed 16. In doing so it pushes ahead of it the pile of powder while spreading a fresh layer across the build bed 16, forming a new build bed surface, or build area 12. Next, both carriages move in the second direction to return to the left hand side of the work surface 13, after which the following sequence is applied: (a) moving the first carriage 30_1 in the first direction over the build area 12 according to a first velocity profile and depositing, using the droplet deposition unit 38, a radiation absorber onto regions of a previously applied layer of powder distributed across a build area 12 that are to define the cross section of the object for that layer; (b) further while moving the first carriage 30_1 over the build area 12 at the first velocity profile v1($t$), operating the first radiation source L1 to apply fusing energy to the build area to fuse the regions of powder where the absorber has been deposited; (c) moving the second carriage 30_2 according to a second velocity profile v2($t$) in the first direction across the build area 12 and operating the powder distributor 36 to distribute a fresh layer of powder across the build area 12; and (d) moving the second radiation source L2 whilst activating the second radiation source to apply energy to preheat the fresh layer of powder.

The basic layer sequence operating on the same layer occurs in the following order: distribute a fresh layer of powder to form a new build area 12; preheat the fresh layer of powder of the build area 12; deposit radiation absorber, which may be a fluid or particulate form, onto one or more regions of the build area 12; and fuse the regions onto which radiation absorber has been deposited.

The process of fusion of adjacent powder particles is time dependent and depends on factors such as the molten particles' surface tension and viscosity. Viscosity is particularly affected by temperature—the hotter the molten particle, the lower its viscosity and the quicker it will coalesce, or fuse, with an adjacent powder particle. The time required for full coalescence (i.e. fusion) of adjacent particles depends on the size, viscosity and surface tension of the particles. In powder bed fusion processes, the duration over which powder remains in the molten state plays a significant role in determining the quality, such as mechanical strength, of the final part as it is the duration over which the molten particles are at their hottest and over which their rate of fusion is at its greatest.

The rate of fusion of the molten particles in powder bed fusion processes is reduced as soon as a fresh (relatively colder) layer of powder particles is distributed on top of the molten particles; the fresh powder cools the underlying molten particles and reduces the rate of fusion. A significant drawback of current approaches to powder bed fusion can be that the time between fusion by radiation (raising the temperature of the regions provided with absorber above the melting temperature) and the distribution of the fresh layer differs depending on the location on the build area: the time from fusion to distribution of a fresh layer over some locations of the layer is different to that time on other locations on the build area—leading to differences in the time over which particles are allowed to fuse and therefore differences in the degree of fusion and the properties of parts created.

The considerations regarding fusion between adjacent particles within the same layer similarly apply to particles in an interfacial region between the fused layer and the freshly distributed layer. The degree of interaction of fresh particles with the fused regions determines the degree of interlayer adhesion and affects the mechanical strength of the finished part. It is desirable furthermore that the mechanical strength does not vary for objects produced at different locations over the build area. The above problems may be overcome or at least reduced by providing a build sequence in which the steps of fusion and distribution occur whilst the first radiation source and the powder distributor are moving in the same direction, in combination with controlling the time interval $\Delta t$, and will now be described in detail.

The time interval $\Delta t$ herein is defined as the delay between fusing regions of a first layer and distributing a second, subsequent ("fresh") layer over the first layer. The control of the time interval $\Delta t$ has been found to be an important requirement of the layer sequence to ensure improved fusion between particles and adhesion between layers and therefore of the mechanical integrity and strength of the object. It has been found that the time interval $\Delta t$ requires careful control so as to ensure adequate interparticle fusion within the layer for regions provided with radiation absorber, as well as between the fused regions and the new layer so that an interlayer of adequate thickness can be formed that provides the desired mechanical properties. The method thus further comprises controlling a time interval $\Delta t$ between the first radiation source L1 and the powder distributor 36 passing each of a plurality of locations on the build area 12 such that at each of the plurality of locations the time interval $\Delta t$ is chosen so as to improve uniformity of the, or to achieve a uniform, energy input between the plurality of points on the build area 12.

For example, a non-flat temperature profile may exist or may otherwise develop in the first direction during a layer sequence, and the first and second velocity profiles may be controlled to render the temperature profile more uniform. A non-flat temperature profile may give rise to variations in the level of temperature at which the molten regions exist over the duration of $\Delta t$, causing variations in viscosity and thus variations in particle coalescence. For example, a decreasing or increasing temperature profile from left to right, in the first direction, is likely to cause weaker parts on the cooler side of the build bed and stronger parts on the opposite, hotter, side, along the first direction. Such a decreasing or increasing temperature profile may be made more uniform by decreasing or increasing respectively the velocity of the first radiation source L1 and/or the powder distributor 36 and/or second radiation source L2.

In other examples, depending on the shape of the region to be fused within a given layer and its location on the build area 12, it may be desirable to increase the layer speed, such as the duration of the sequence and/or the speed at which the moving units pass the build bed surface in the first direction while ensuring adequate intra- and interlayer fusion. Changing the first and/or second velocity may cause a change in energy input into the regions to be fused by the first radiation source L1 to compensate for system intrinsic temperature variability along the first direction on the build area. The temperature profile on the build area 12 may be monitored layer-by-layer by a thermal sensor such as a thermal camera 70 during the process of manufacturing the object. The velocity profile of the first radiation source L1 and/or the powder distributor (and/or of the second radiation source L2, if this is independently moveable from the powder distributor 36) during their movement in the first direction may be frequently or even continuously adjusted based on thermal feedback for the build area 12, such that the time interval $\Delta t$ is frequently or continuously adjusted based on thermal feedback for the build area in the first direction. A preferred method involves controlling the time interval $\Delta t$ between the events of fusing by the first radiation source L1 and the distribution of a fresh layer by the powder distributor 36 such that at each of the plurality of locations, the time interval $\Delta t$ remains substantially constant between fusing and distributing a fresh layer at each of the plurality of locations.

In the above it should be understood that it is not essential for the method and its variants to be carried out by two carriages. In some implementations, all components may be mounted on a single carriage, for example arranged in the order of the sequence of the steps in which they are to be utilised in the first direction. Where it is desirable to adjust the time interval $\Delta t$ between the first radiation source L1 and the powder distributor 36, without lowering or increasing the velocity of the single carriage, the distance between the first radiation source L1 and the powder distributor 36 may be manually or electronically adjustable. In alternative arrangements, some or all of the components may be independently moveable from the others.

Therefore, in the method herein, a droplet deposition unit 38, a first radiation source L1, a powder distributor 36 and a second radiation source L2 are moveably provided over the working surface 13, the working surface 13 comprising a build area 12 on which the object is formed layer-by-layer, wherein the method comprises, in a first direction across a plurality of locations on the build area 12, the steps of:

(a) moving the droplet deposition unit 38 and depositing, using the droplet deposition unit, a radiation absorber onto regions of a previously applied layer of powder distributed across the build area 12;

(b) moving the first radiation source L1 according to a first velocity profile $v1(t)$ whilst activating the first radiation source L1 to apply fusing energy to the build area 12 to fuse the regions of powder where the absorber has been deposited;

(c) moving the powder distributor 36 according to a second velocity profile $v2(t)$ and distributing a fresh layer of powder over the build area 12; and (d) moving the second radiation source L2 whilst activating the second radiation source to apply energy to preheat the fresh layer of powder;

wherein the method further comprises adjusting the first and/or second velocity profiles $v1(t)$, $v2(t)$ to control a time interval $\Delta t$ between the passing of the first radiation source and the powder distributor at each of the plurality of locations.

Within the same layer, therefore, for a plurality of locations along the first direction, variations in the thermal cycle may be reduced or compensated for between a plurality of locations positioned at least along the first direction on the build area by controlling the time interval Δt. The thermal cycle comprises the steps (a)-(d), which for the same layer occur in the order of (c), (d), (a), (b), i.e. distribution of a fresh layer, followed by preheating the fresh layer, followed by deposition radiation absorber onto the fresh layer, and followed by fusing the regions onto which radiation absorber has been deposited.

A controller 200 comprised within the apparatus is arranged to receive operating instructions for moving the carriages 30_1, 30_2. The controller 200 is further arranged to receive instructions from a data store and apply the first and second velocity profiles v1(t), v2(t) of the two carriages 30_1, 30_2, and at least one value Δt so as to control the timing, or the time interval Δt, between the steps of fusing the regions that radiation absorber has been applied to and the step of distributing a fresh layer of powder.

The method steps presented in the preferred variant reduce or prevent differences in the thermal cycle (as defined by a full layer sequence) as experienced at different locations across the build area 12 along the first direction, without added complexity of varying significantly the first and second velocities. In other words, it is preferable that the instantaneous velocities of the first radiation source and the powder distributor are adjusted to remain constant, and equal to one another. This means that the time interval delta also remains constant and equal for different locations on the build area. Where the time interval Δt is controlled to remain constant, all points of the build area 12 experience the same sequence steps of distributing powder and fusing with identical durations with respect to relative timings.

Preferably, a preheat interval between the steps of powder distribution and preheating by the second radiation source at each of the plurality of points also remains substantially constant at each of the plurality of points. This may most easily be achieved by providing the second radiation source to the second carriage 30_2, behind the powder distributor 36 so that it follows the powder distributor at a fixed time interval when the second carriage 30_2 is moved in the first direction.

Thermal events that occur during a typical thermal cycle are:

distributing a fresh layer of powder: The fresh powder is at a significantly lower temperature compared to the target temperature of the build area 12, which is typically close to, but below, the melting temperature of the powder so as to avoid large thermal differences. The fresh powder layer causes a sudden drop in temperature of the build area 12. Distribution of the fresh layer should therefore occur before the fused, hot, regions of the (previous) layer become too viscous as result of cooling to allow adhesion of the fresh particles to previously fused regions;

preheating the freshly distributed layer of powder to raise its temperature back to or near to (in case of other, supplementary, preheat devices such as a static overhead heater being used, such as overhead heater 50 indicated in FIG. 1) the target temperature using a moveable radiation source. This may be a rapid thermal event to recover with little delay the temperature of the build area 12;

irradiating the build area 12 with fusing energy so as to fuse the regions provided with radiation absorber: this event causes a significant increase in temperature of the build area 12.

The layer sequence may include multiples of each of these such steps in the same layer sequence (for example multiple preheating steps).

By providing the steps of fusion and distributing a fresh layer in the same direction over the build area 12, overall process uniformity may be improved with respect to the thermal impact on the build area. Furthermore, considering a plurality of locations along the first direction of the build area 12, in combination with controlling the time interval Δt between these steps, improved balance between thermal events (i.e. of the respective thermal cycle experienced at each location) may be achieved between the plurality of locations of the build area 12. Within the same layer, therefore, for a plurality of locations along the first direction, variations in the thermal cycle may be reduced or compensated for between a plurality of locations positioned at least along the first direction on the build area by controlling the time interval Δt.

A similar consideration may apply to the same degree or at least to some degree for multiple fusing and preheating events such that these also occur in the first direction as the fusing step provided by the first radiation source and distributing step provided by the powder distributor. In other words, it may further be preferable that a preheat delay between distributing a fresh layer of powder and preheating the fresh layer of powder (i.e. between the powder distributor 36 and the second radiation source L2 passing each of a plurality of locations) remains substantially constant for each of the plurality of locations.

This will now be illustrated with reference to FIGS. 2A-2E and 3 for an example variant of the method.

Turning first to FIGS. 2A-2E, a schematic plan view of movement over the build area 12 shows, for simplicity, only a moveable first radiation source L1 and a powder distributor 36 which are positioned to the left hand side of the build area 12 at the start of a sequence (a) to (d). Two locations on the build area 12 are indicated: point P1 on the far lower corner of the build area 12 and point P2 on the near upper corner of the build area 12 as viewed from above. Point P1, located close to an edge of the build area 12 in the first direction (i.e. near the end of a fusion pass, for example), will experience the same thermal events offset by a time interval Δt with respect to point P2 located towards an opposite edge, in the second direction.

In FIGS. 2A-2E, the two modules are shown in respective positions above the build bed surface 12 at different stages of the layer sequence. It should be noted that the sequential times indicated over the duration of the sequence are intended to refer to times elapsed after which the first heat source L1 arrives in the positions shown.

At time t0, at the start of the sequence, both first radiation source L1 and powder distributor 36 are positioned to the left hand side of the build area 12 and the first radiation source L1 is initiated to move towards the build area 12 at velocity profile v1(t), while the powder distributor remains in the starting position.

At a time t1, defining a time interval Δt=t1−t0, the powder distributor 36 is also initiated, to move at second velocity profile v2(t) in the first direction and following the first radiation source. Upfront of the first radiation source L1, and not shown, a droplet deposition unit 38 is moved across the build area 12 to deposit a pattern of radiation absorber where regions of fused particulate material are to form.

Figure 2:
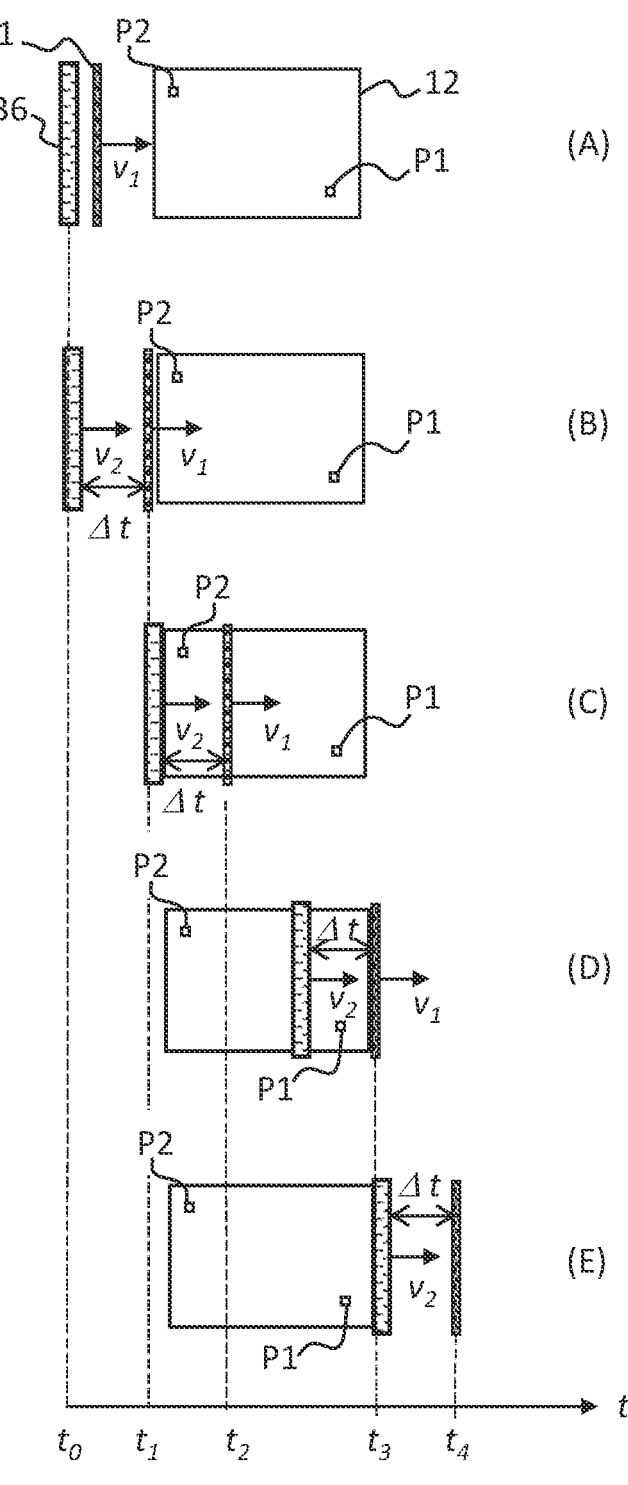
FIG. 2 schematically illustrates a process sequence of the apparatus of FIG. 1.

At t2 in FIG. 2C, the first radiation assembly has passed over point P2, so that P2 experienced the hottest moment of the cycle. If P2 contains radiation absorber, the powder at P2 has melted. At this time of the sequence, the powder distributor has reached the near edge of the build bed surface 12 to start distributing a new layer.

At time t3 in FIG. 2D, the powder distributor has also passed point P2, distributing the fresh layer at this location and causing significant cooling at P2 compared to hottest part of the sequence of the first radiation assembly passing. Furthermore, the first radiation assembly has passed P1 at the far corner of the build area 12, heating up P1 to the hottest temperature of the cycle. If P1 contains radiation absorber, the powder at P1 has melted.

At time t4, the first radiation assembly has reached the end of its pass in the first direction (L-R) and stops. The powder distributor has passed P1 and the far side of the build area 12, distributing the fresh layer at this location and causing significant cooling at P1 compared to its hottest part of the sequence of the first radiation assembly passing.

In the preferred example illustrated, the first and second velocity profiles $v1(t)$ and $v2(t)$ are constant profiles and equal to one another, and the time interval $\Delta t$ remains constant at all locations of the build bed surface 12. If $\Delta t$ is chosen appropriately, the powder at P1 and P2 has fused sufficiently within the layer before the powder distributor 36 passes, and also remains sufficiently molten to form an interlayer of suitable thickness with the fresh layer to provide an adequate mechanical interlayer strength. In other words, at the molten powder at the time of having a fresh layer laid over it is still in a sufficiently fluid state to interact with the fresh powder. A suitable time interval $\Delta t$ may thus be chosen based on, for example, the highest temperature of the molten regions and the final temperature of the molten regions before a fresh layer is laid over the region, to ensure that a sufficient degree of fusion between particles can be achieved before the fresh layer is distributed.

Furthermore, the temperature at P1 and P2 will significantly drop as soon as the colder, fresh layer is laid over these locations. The time interval $\Delta t$ may thus further be based on the temperature of the fresh layer and the thermal dissipation through the fresh layer, i.e. on how quickly the molten region cools down and becomes too viscous after the fresh layer has been laid over it in order to form an interlayer of adequate thickness for mechanical strength. A suitable time interval $\Delta t$ will thus further ensure that the fused particles are still in a sufficiently molten state to allow the fresh layer to adhere sufficiently. Such timings may be material dependent (chemical structure, the average particle size/molecular weight and their distribution for example) and/or process dependent, for example dependent on the basic temperature to which each layer is preheated. Control may for example be achieved by empirically determining a suitable time interval $\Delta t$ for a specific powder target build bed temperature.

In FIGS. 2A to 2E, not shown is the second radiation assembly that, after the distribution of the fresh layer, is operated while being moved across the build area 12 to provide energy to the freshly laid layer and to raise the build area temperature back towards the target temperature (e.g. a preheating step).

Figure 3:
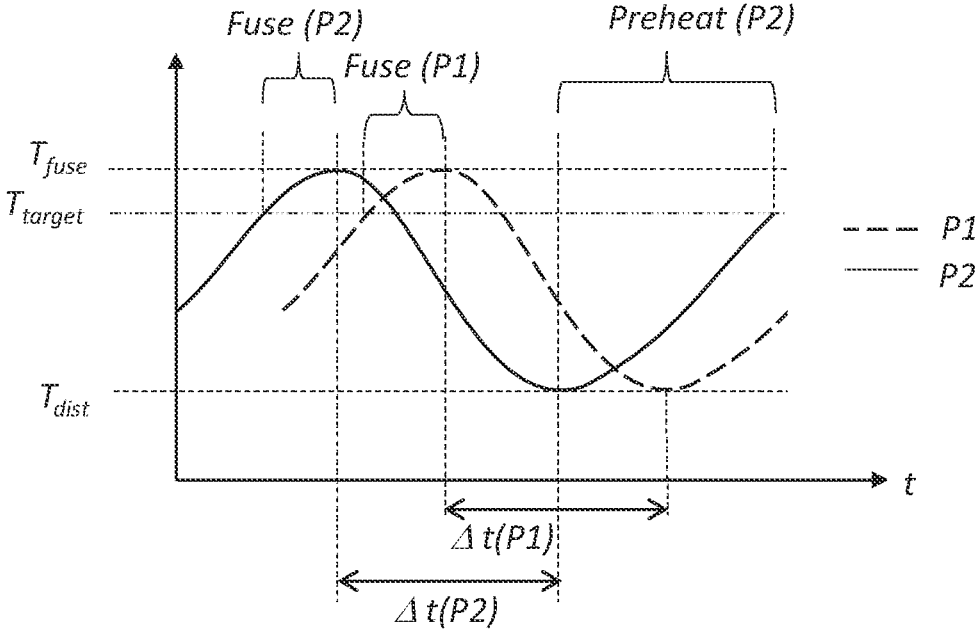
FIG. 3 schematically illustrates a thermal cycle for two locations P1 and P2 on the build area.

The resulting thermal cycle at locations P1 and P2 is schematically illustrated in FIG. 3. Since the first and second velocity profiles $v1(t)$ and $v2(t)$ are constant and equal to one another, the time interval $\Delta t$ remains constant at all locations of the build bed surface 12. As the layer sequence progresses in the first direction over its duration, for each of the two locations P1, P2 on the build bed surface, an illustrative temperature fluctuation is indicated, for P1 by the dashed line and for P2 by the solid line. Taking P1 as an example, when the new layer is distributed at P1, the temperature at P1 falls to its lowest during the sequence, indicated by the temperature $T_{dist}$. After this, P1 experiences preheating to the target preheat temperature $T_{target}$, by being heated by the passing second radiation source L2 (and optionally in addition by the overhead heater 50, which may be operated constantly during the layer sequence). After this, the first radiation source L1 passes and elevates the temperature at P1 to the fusing temperature $T_{fuse}$, use, which is the highest temperature of the layer sequence. The time interval $\Delta t$ between fusing at P1, achieving $T_{fuse}$, and distributing a subsequent ("fresh") layer at P1, achieving $T_{dist}$, is the time interval $\Delta t$ as indicated by $\Delta t(P1)$. Similarly, the same events happen at P2, offset by a delay that is defined by the velocity of the first radiation source L1 and the powder distributor 38, and the distance along the first direction between P1 and P2. Since the time interval $\Delta t$ between the steps of fusion and distribution of a new layer is controlled, and preferably remains constant as shown here, both locations, despite their very different positions on the build area 12, experience the same thermal cycle as each other at different times determined by the velocity profile $v1(t)$ of the first radiation source (i.e. that of the first carriage 30_1) and the velocity profile $v2(t)$ of the powder distributor (i.e. that of the second carriage 30_2). In other words, the time interval $\Delta t(P2)$ between distribution and fusing for P1 is the same as the time interval $\Delta t(P2)$, i.e. $\Delta t(P1)=\Delta t(P2)$.

This means that for a plurality of locations along the first direction, variations in the thermal cycle may be reduced or compensated for between a plurality of locations positioned at least along the first direction on the build area by controlling the time interval $\Delta t$ to be the same at each location; preferably wherein each location experiences substantially the same corresponding thermal events of the thermal cycle with respect to at least the same durations at relative timings, thus creating uniformity of the layer process across the entire build area. In FIG. 3, furthermore, the duration of time of the layer sequence is constant for each layer, which is preferable for a consistent thermal cycle.

The thermal cycle thus further includes providing a controlled time interval $\Delta t$ to achieve a suitable degree of fusion between powder particles in the fused regions before distributing a fresh layer over the fused regions, while further avoiding too much of a temperature drop that would cause the molten regions to become too viscous to sufficiently engage with the fresh layer and form a thick enough interlayer for adequate part quality. Since viscosity is inversely proportional to temperature, the time interval may be controlled in combination with considerations of temperature levels of the fused regions between fusing and distributing the fresh layer.

In the process sequence illustrated in FIGS. 2A to 2E and resulting thermal cycles in FIG. 3, the velocities and velocity profiles of the first radiation source L1 and the powder distributor 36 are shown as equal and constant, i.e. $v1(t)=v2(t)=$constant. Therefore, the time interval $\Delta t$ between fusion and distribution of the new layer remains fixed over the layer sequence, i.e. time interval $\Delta t=$constant. In addition, thermal events occur at each point of the build area 12 with the same relative timings and over the same durations. Thus variability in the thermal cycle between all points of the build area 12 may be prevented or at least reduced.

Thus, in a preferred variant, which may be implemented by any of the various carriage layouts in FIGS. 4, 5 and FIGS. 7-13, the first and second velocity profiles over the build bed surface 12 are equal and constant, i.e. $v1(t)=v2(t)=$constant, such that at each location on the build bed surface, for a given layer, the time interval $\Delta t$ is the same. In addition, preferably the time interval $\Delta t$ is the same for each layer of the build process of the object.

Furthermore, preferably a second time interval between the passing of the powder distributor 36 and the passing of the first radiation source L1 in the first direction over the build bed surface 12 is the same for each layer, such that the respective periods of time from layer to layer defined by the initiation of the steps of fusing the regions of powder in adjacent layers and of the steps of distributing a fresh layer of adjacent layers is substantially the same for each layer.

The step of passing the second radiation source L2 so as to preheat the freshly distributed layer may be carried out at a third velocity profile over the build bed surface 12 that is the same as the first and second velocity profiles over the build bed surface 12. In this way the preheat delay between the step of passing the powder distributor 36 and the step of passing the second radiation source L2 in the first direction over the build bed surface 12 may be substantially constant at each of the plurality of locations. Preferably, the preheat delay is the same for each layer.

Where the first and second velocity profiles are the same and constant velocities, a fuse delay between the step of passing of the second radiation source L2 in the first direction over the build bed surface 12 and the subsequent step of passing the first radiation source L1 in the first direction over the build bed surface 12 remains substantially constant at each of the plurality of locations. Preferably, the fuse delay is substantially the same for each layer.

While the step of moving the droplet deposition unit 38 to deposit radiation absorber may not be considered a significant thermal event in some variants of the method, furthermore the droplet deposition unit 38 may be moved in the first direction at the same velocity profile over the build bed surface 12 as the first and second velocity profiles, such that a deposition delay between the step of passing of the second radiation source L2 and the step of passing of the droplet deposition unit 38 in the first direction at each of the plurality of locations is constant for each layer. Furthermore the deposition delay may be the same for each layer.

For further thermal process consistency, it is preferable to control the respective return time intervals over which each respective one of the droplet deposition unit 38, the first radiation source L1, the second radiation source L2 and the power distributor 36 are moved back along the second direction opposite the first direction, such that each of the respective return intervals is the same for each layer. With reference to, for example, FIG. 4 or FIG. 13, the fuse delay may be illustrated as the time between passing the second radiation source L2 and the first radiation source L1 (and where optionally, for FIG. 13, the third radiation source L3 is present, the time between passing the second radiation source L2 and the third radiation source L3) over each location on the build bed surface.

In a preferred variant of the method, each layer of the object may be processed according to the same first and second, constant and equal, velocity profiles, the same constant time interval $\Delta t$, the same preheat delay and the same fuse delay, such that the duration of time over which each layer is processed is constant. For further improvements of thermal uniformity it may be preferable that the first and second radiation sources L1, L2 are operated continuously while passing over the build bed surface, so as to apply energy to the entire build bed surface 12 along the first direction.

In carriage layouts comprising further radiation sources, preferably each of the radiation sources are moved in the first direction at the same, preferably constant, velocity profile as the first and second velocity profiles, and the respective time delays between the passing of each radiation source and the passing of the next radiation source in the first direction over the build bed surface 12 may remain substantially constant at each of the plurality of locations. In other words, the time intervals between significant successive thermal events may remain the same for each layer, and the duration of time for each layer sequence remains constant for each layer.

This preferred method may be applied using any of the variants of the carriage layouts described in the following, and provides for a consistent, stable thermal cycle throughout a build process of an object, improving thermal uniformity and the quality of the object.

The various radiation sources are preferably operated for the entire duration of their movement over the build bed surface 12 so as to apply energy to the entire build bed surface irrespective of their function. The plurality of locations may thus span the length of the build bed surface 12 along the first direction; furthermore the plurality of locations may also span the width of the build bed surface. The plurality of locations may represent substantially all of the build bed surface 12.

In variants, alternatively, the time interval $\Delta t$ may be adjusted during the layer sequence, for example as a result of left to right temperature variations across the build bed 16 (and build area 12) due to for example a significant thermal mass being present in the build bed 16. The time interval $\Delta t$ may be adjusted by varying the one or both of the first and second velocities $v1(t)$ and $v2(t)$. For example, if the build area is hotter at locations towards the end of a pass of the first radiation source compared to elsewhere along the first direction, it might be beneficial to increase at least the first velocity $v1$ towards the end of the pass of the first radiation source L1 so that the first radiation source has less time t0 provide fusing energy to those locations near the end of the pass in the first direction. This might for example mean that the temperature achieved above the melting point for those locations is compensated and made uniform with that of other locations; optionally the time interval $\Delta t$ is adjusted by decreasing the second velocity while the first velocity is increased, such that the time interval $\Delta t$ remains substantially constant to allow for adequate interlayer broadening. Further consideration regarding controlling the time interval $\Delta t$ will be described in more detail below with reference to the controller. Therefore, in variants of the apparatus implementing the methods, and in which the second radiation source (preheating source) L2 may not be provided on the second carriage 30_2 but is independently moveable from the powder distributor 36, the preheat delay between distribution and preheating is preferably also controlled for thermal consistency and may preferably be constant during movement in the first direction.

Apparatus for Use in the Methods

In the following and with reference to FIGS. 4 to 13, variants of the method will now be presented together with different carriage arrangements suitable to support the methods.

Figure 4:
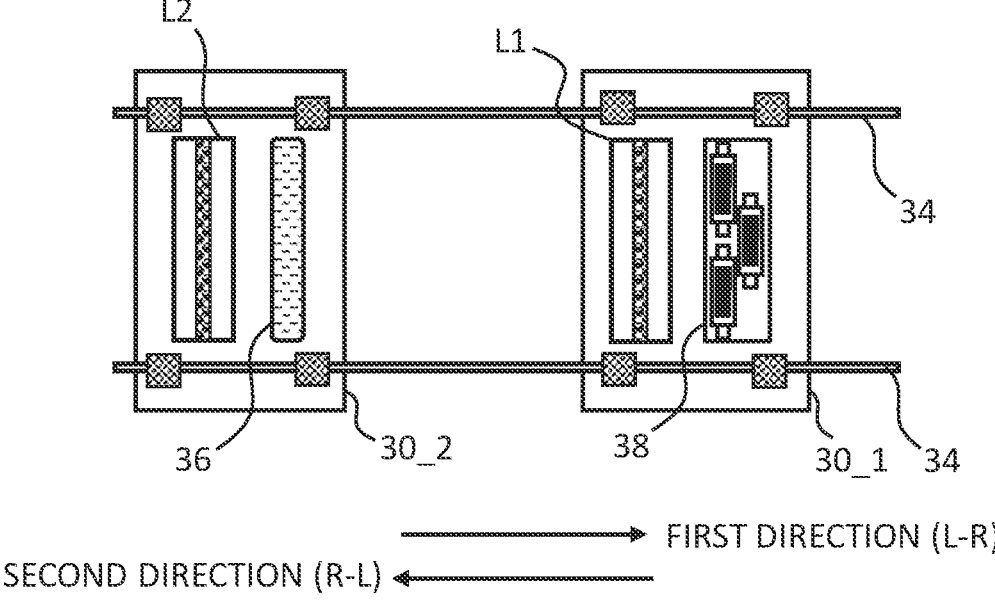
FIG. 4 schematically illustrates an arrangement of a first radiation source on a first carriage and a powder distributor on a second carriage as viewed from below.

FIG. 4 is a schematic top view showing a layout for the first and second carriages 30_1 and 30_2 suitable to carry out the method illustrated with the help of FIGS. 1 and 2A to 2E. The first and second carriages 30_1, 30_2 are shown on common rails 34 and are independently moveable one after the other in the first and second directions.

The first carriage 30_1 is provided with the first radiation source L1 operable to fuse the powder onto which radiation absorber has been deposited. A droplet deposition unit 38 is also shown provided on the first carriage 30_1, in the first direction with respect to the first radiation source L1, such that the droplet deposition unit 38 is operable to deposit a pattern of a radiation absorber onto regions of a layer of powder distributed across a build area 12, by moving the first carriage 30_1 in a first direction, ahead of the first radiation source L1.

In FIG. 4, the powder distributor 36 is provided on the second carriage 30_2, so that the step of distributing a fresh layer of powder is carried out by moving the second carriage 30_2 in the first direction and following the first carriage 30_1. In addition, the second radiation source L2 is provided on the second carriage 30_2, in the second direction with respect to the powder distributor 36, so that the step of preheating the fresh layer of powder may be carried out immediately after distributing the fresh layer of powder by operating the second radiation assembly while moving the second carriage 30_2 in the first direction.

With this layout of carriages, the steps of depositing radiation absorber using a droplet deposition unit 38; fusing regions of the layer that have been provided with radiation absorber by irradiating with the first radiation source L1; distributing a fresh layer using a powder distributor; and preheating the fresh layer by operating the second radiation source can all be carried out in the first direction, while allowing a controllable time interval Δt, such as a constant time interval Δt, to be applied between the first carriage 30_1 and the second carriage 30_2 movement.

Figure 5:
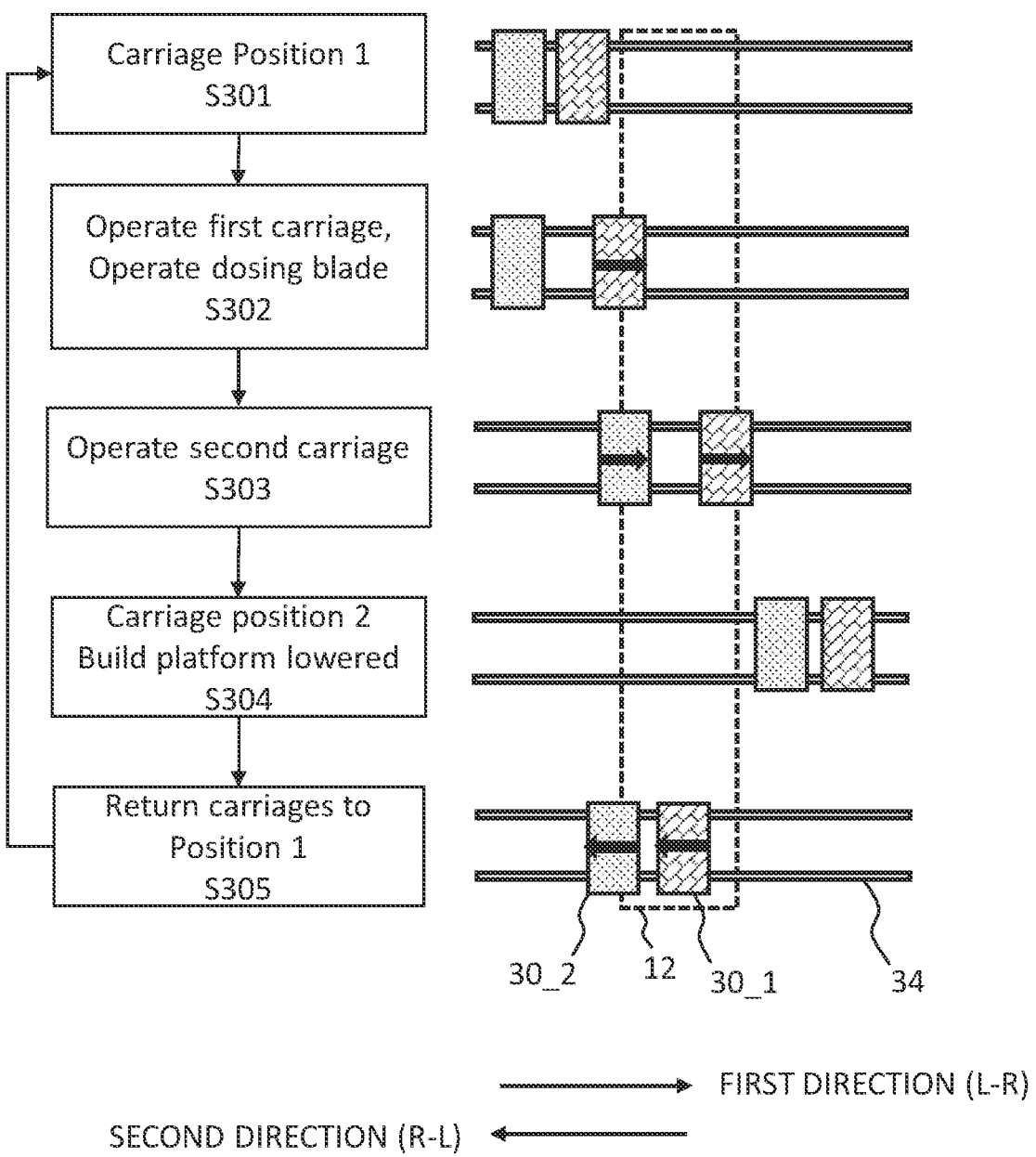
FIG. 5 is a flow diagram illustrating an example of a layer sequence.

A sequence for processing one layer applying this consideration is described with the help of a flow diagram in FIG. 5 and with reference to the carriage arrangement of FIG. 4. It should be noted that this sequence is also applicable to carriage arrangements having further radiation sources providing different sub step options enabling additional preheating and/or fusing steps while allowing control of the time interval Δt between the two carriages 30_1 and 30_2 as they pass over the build area 12, and as will be described below.

With reference to FIG. 4, in the flow diagram of FIG. 5, the first radiation source L1 is provided on the first carriage 30_1 and the powder distributor 36 is provided on the second carriage 30_2, the first carriage 30_1 and the second carriage 30_2 being independently moveable relative to one another to move across the working surface, such that the first carriage 30_1 moves at the first velocity profile v1(*t*) and the second carriage 30_2 moves at the second velocity profile v2(*t*). The first carriage 30_1 in this variant also comprises the droplet deposition unit 38 arranged in the first direction with respect to the first radiation source L1 (i.e. ahead of the first radiation source in the first direction), such that the first radiation source L1 follows the droplet deposition unit 38 during the movement of the first carriage 30_1 in the first direction. The second carriage 30_2 further comprises the second radiation source L2 arranged in the second direction with respect to the powder distributor 36, such that the second radiation source L2 follows the powder distributor during the movement of the second carriage 30_2 in the first direction.

Describing the sequence steps illustrated in FIG. 5 in detail:

At step S301, both carriages 30_1 and 30_2 are located at a starting position, Position 1, in the second direction with respect to the build area 12 and clear of the build area;

At S302, the movement of carriage 30_1 is initiated at the first velocity (not shown in this illustration for simplicity). For apparatus in which powder is dosed to the work surface 13 from below, a dosing blade or similar is operated to dose a pile of powder to the work surface 13 ahead of the powder distributor 36. While the first carriage 30_1 moves across the build area 12, the droplet deposition unit 38 is operated to deposit a pattern of radiation absorber onto the layer of powder of the build area 12. At the same time, the first radiation source L1 is operated to fuse the regions onto which radiation absorber has been deposited;

After a controlled time interval Δt, at step S303, the movement of the second carriage is initiated and the second carriage 30_2 follows the first carriage at a velocity profile v2(*t*). While the second carriage 30_2 moves across the build area 12, the powder distributor 36 distributes a fresh layer of powder. At the same time, the second radiation source L2 is operated to preheat the fresh layer of powder;

At step S304, both carriages have reached their Position 2 in the first direction with respect to the build area 12 and clearing the build area;

The build platform is lowered and at step S305, both carriages 30_1, 30_2 are operated to return to the starting position, Position 1.

The above steps complete one layer sequence.

Figure 6:
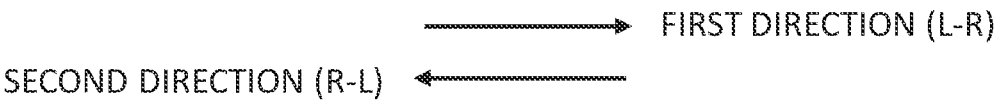
FIG. 6 is a table of layouts for the carriages illustrated in FIGS. 7 to 11.

FIG. 6 illustrates, by use of a table, various combinations of carriage arrangements that provide a further radiation source on at least one of the first and second carriage 30_1, 30_2. In the table of FIG. 6, the first radiation source is annotated as 'L1' and the second radiation source as 'L2', whereas the further radiation sources are annotated as 13' (if on the first carriage 30_1) and as 'L4' if on the second carriage 30_2. The carriage configuration illustrated in FIG. 4 is therefore indicated by layout 7(*i*), wherein radiation source L2 is equivalent to radiation source L2 in FIG. 4. In some of these, the further radiation source may be arranged on the same side of the carriage as the first radiation source L1 (if provided on the first carriage 30_1) and/or as the second radiation source L2 (if provided on the second carriage 30_2).

Layout 6(*xv*) is also able to provide the sequence of FIG. 4, however with a time delay before the preheating step of the fresh powder. In this sequence, the powder distributor 36 is not immediately followed by a preheat radiation source provided on the second carriage 30_2; instead the preheat source is provided ahead of the droplet distribution unit to preheat the fresh layer immediately before the deposition of the radiation absorber.

In other words, the second radiation source (here illustrated as L3) may be provided on the first carriage 30_1, in the first direction with respect to the droplet deposition unit 38 (i.e. ahead of the droplet deposition unit 38 in the first direction). In the sequence on the same layer, the second radiation source L3 thus leads the droplet deposition unit 38 and preheats the fresh powder layer distributed by powder distributor 36 (albeit with a delay) during the movement of the second carriage 30_2 in the first direction. In this case the preheat step occurs during step S302 during operation of the first carriage and its movement in the first direction.

Providing a preheating radiation source (second radiation source L3) moveable on the first carriage ahead of the droplet deposition unit 38 may be desirable where there is a temperature non-uniformity in the first direction on the build bed 16 that is not addressable by any other radiation source in the required timeframe.

Alternatively, or in addition, the apparatus may comprise a stationary overhead heater 50 arranged above the build bed 16 (not specifically indicated in FIG. 1 but well known in the art) and operable at a wavelength suitable for preheating the powder layer. The overhead heater 50 may comprise halogen lamps that are sufficiently reactive to changes in operating energy and thus able to preheat the fresh layer sufficiently between the step of distributing the fresh layer and depositing radiation absorber onto the fresh layer (with return pass in between from Position 2 to Position 1), and before the further radiation source L3 operable as preheat source raises the temperature of the build area 12 to its final pre-deposition temperature ahead of the operation of the droplet deposition unit 38.

Meanwhile the various combinations described with respect to FIGS. 5 to 11 are indicated by layouts 6(*ii*) to 6(*xv*) of FIG. 6 by illustrating arrangements with further radiation sources L3 and/or L4. It should be noted that the arrangements exemplified in FIGS. 12 and 13 can achieve equivalent or similar combinations or added functionality. For example, the droplet deposition unit 38 of any of the layouts may be independently moveable on a third carriage 30_3, with the further radiation source L3 of layouts 6(*xii*)-6(*xv*) either also provided on the third carriage and in the first direction with respect to, and so as to lead, the droplet deposition unit, or on a separately moveable, fourth carriage, and so on. Similarly, the single carriage variant illustrated in FIG. 13 may be adapted to support the arrangement of any of the layouts of FIG. 6.

Note that in FIG. 6, L1 is shown in bold to indicate that L1 is arranged to fuse the region onto which radiation absorber has been deposited. Similarly for L3, where L3 is operated to provide a second fusing step, L3 is shown in bold. Where L3 is not shown in bold, L3 is arranged to preheat. The capability provided by the variants illustrated in FIG. 6 will now be described, with reference to the carriage configurations illustrated in FIGS. 7 to 12.

Post-Distribution Preheating Steps

Variants for the second carriage 30_2 in combination with the first carriage 30_1 comprise providing a further radiation source L4 to the second carriage 30_2 to carry out an additional preheating step, as shown in layouts 6(viii) to 6(*xii*), in which the further radiation source L4 follows the second radiation source L2 as the second carriage 30_2 moves in the first direction and is operable to preheat the fresh layer to supplement the second radiation source L2;

providing a further radiation source L3 to the first carriage 30_1 in the first direction with respect to the droplet deposition unit 38 to provide an additional preheating step, as shown in layouts 6(*xii*) to 6(*xiv*). The further radiation source L3 is operable to preheat the build area 12 ahead of droplet deposition as the first carriage 30_1 moves in the first direction.

In this way it is possible to provide two or three preheating steps at for example overall lower energy compared to only one preheating step, by operating L2 and L4 each at a lower duty cycle compared to the duty cycle of L2 when L4 is not provided, if L2 and L4 are identical in performance; or an initial lower intensity preheating step following by a higher intensity preheating step (for example by operating L2 at a lower duty cycle than L4, where L2 and L4 are identical in performance); or an initial higher intensity preheating step following by a lower intensity preheating step (for example by operating L2 at a higher duty cycle than L4, where L2 and L4 are identical in performance).

Multiple preheating steps may be applied to provide a shallower ramp in preheat energy to the freshly distributed layer. Alternatively, the preheating duration may simply be prolonged by passing two radiation sources one after the other over the build area 12 to preheat the freshly distributed layer, as is possible with the layouts of 6(viii) to 6(*xii*). This may allow the second carriage to move at a higher second velocity without impacting on the preheating energy imparted on the build area by the freshly distributed layer.

More than one preheating step may be carried out by at least one of:

(i) operating a third radiation source L3 while moving the third radiation source L3 in the first direction across the build area 12 and leading the droplet deposition unit 38, wherein the third radiation source L3 is operable to preheat the layer of powder; and wherein the third radiation source L3 may be provided on the first carriage 30_1 in the first direction with respect to the droplet deposition unit 38; and (ii) operating a further radiation source L4 while moving the further radiation source in the first direction across the build area 12 and following the second radiation source L2, wherein the further radiation source is operable to preheat the layer of powder; and wherein the further radiation source L4 may be provided on the second carriage 30_2 in the second direction with respect to the second radiation source L2.

Two preheat steps may be provided by the layouts 6(*xii*), and three preheat steps in the first direction may be provide by layouts 6(xiii) and 6(*xiv*).

This allows an additional preheating step to be carried out immediately before droplet deposition of the radiation absorber by the droplet deposition unit 38 onto the build area 12, and closer in time t0 the step of fusing.

Post-Fuse Preheating Steps (Preheating Between Fusing and Distributing)

In layouts 6(*ii*), 6(*v*) to 6(*vii*) and 6(*x*), 6(*xiv*) and 6(*xv*), a further radiation source operable to preheat is provided either ahead of the powder distributor (L4) on the second carriage and/or following the first radiation source (L3 following L1) on the first carriage 30_1 along the first direction, so as to enable one or more preheating steps after the step of fusing and before the step of powder distribution.

Therefore, one or more post-fuse preheating steps may be carried out by at least one of:

operating a further radiation source L3, while moving the further radiation source L3 in the first direction across the build area 12 and following the first radiation source L1, wherein the further radiation source is operable to preheat the layer of powder comprising the fused regions, and wherein the further radiation source L3 may be provided on the first carriage 30_1 in the second direction with respect to the first radiation source L1; and (ii) operating a further radiation source L4, while moving the second carriage 30_2 in the first direction across the build area 12 and leading the powder distributor 36 (while also following the first radiation source L1), wherein the further radiation source is operable to preheat the layer of powder comprising the fused regions, and wherein the further radiation source L4 may be provided on the second carriage 30_2 in the first direction with respect to the powder distributor 36.

Layouts capable of achieving two post-fuse preheating steps are layouts 6(*vi*) and 6(*xv*), in which a further preheat radiation source L3 is provided on the first carriage in the second direction with respect to the first radiation source and is operated as a preheat radiation source; or in which two radiation sources L2 and L4 are provided ahead of the powder distributor 36 (in which case the function of preheat after powder distribution is provided by a further radiation source L3 on the first carriage 30_1, ahead of the droplet deposition unit 38). As the first carriage 30_1 is moved across the build area 12 the step of fusing is followed by a step of preheating using the further radiation assembly L3 operated as preheat source, providing one post-fuse preheating step.

Provision of one or more post-fuse preheating steps allows improved control over the time interval Δt in combination with an ability to control the temperature of the fused layer ahead of distributing the fresh layer of powder. These additional steps are also carried out in the first direction during movement of the first and second carriage 30_1, 30_2 in the first direction, by operating the second radiation source L2 and optionally also the further radiation source L3 as the second carriage 30_2 moves across the build area 12 so as to deposit a fresh layer of powder. Such arrangements and methods may be desirable in applications in which the temperature of the build area 12 needs to be tightly controlled before the step of distribution, for example to boost fusing of powder particles by increasing further the binding of particles between different layers and help with object properties in the (vertical) build direction z. Alternatively, since radiation energy output of the moveable radiation sources is inversely proportional to the velocity of the radiation source, post-fuse preheating ahead of the powder distributor 36 may allow faster process steps by offsetting the additional preheating against powder distribution velocity. This may be particularly beneficial in apparatus in which the static overhead heater 50 comprises ceramic heating elements with a reaction time too long to instantaneously adjust the build bed temperature. Furthermore, the additional preheating steps may be used to even-out nonuniformities along the first direction that cannot be adjusted fast enough before distribution using the overhead heater 50.

Two Fusing Steps

In some variants of the method, it may be desirable to extend the duration of fusion. This may be achieved by providing a second fusing step after the first fusing step. The second fusing step may be carried out by operating a further radiation source L3 operable to provide fusing energy to the regions previously fused by the first radiation source L1, the further radiation source L3 being arranged to follow the first radiation source L1 during its movement in the first direction. The further radiation source L3 may be provided on the first carriage 30_1 in the second direction with respect to and alongside, the first radiation source L1.

Such an arrangement is illustrated by layouts 6(*iii*), 6(*vii*) and 6(*ix*). A second fusing step provides for an extended duration over which fusing radiation may be applied to the regions of the build area 12 to which radiation absorber has been provided. This extends the duration over which fusion within the regions may be achieved. It may be applied to shorten the time interval Δt between the steps of fusing and distributing a fresh layer to ensure that the fresh layer and the fused regions can form an interlayer of thickness adequate for the desired mechanical strength. Controlling the time interval Δt between the step of fusing and distributing a fresh layer may further be based on the second step of fusing provided by the further radiation source L3. Alternatively to extending the duration of the step of fusion, it may be possible to increase the first velocity of the first carriage 30_1 without reducing the duration over which the energy of fusion is imparted to the regions to be fused. For example, the time taken to complete the movement in the first direction may be reduced.

In combination with providing a second fusing step, different arrangements of the second carriage 30_2, which may comprise a further radiation source to provide a second preheat step (layout 6(*xi*)) or a post-fuse preheating step (layout 6(*vii*)), provide additional functionality.

Post-Deposition Preheating Step

In some of the combinations, a post-deposition preheating step may be carried out by a further radiation source L3 operable to preheat the layer onto which radiation absorber has been deposited but before operating the first radiation source to fuse the regions. This means the further radiation source L3 is operable as a preheating source between the steps of depositing radiation absorber onto regions of the build area 12 and fusing the regions while moving the further radiation source L3 in the first direction across the build area 12. The further radiation source L3 may be provided on the first carriage 30_1 between the droplet deposition unit 38 and the first radiation source L1. The further radiation source L3 is thus operable to preheat the build area 12 after the step of depositing radiation absorber on to the powder layer. Layouts capable of providing a post-deposition preheating step are shown by layouts 6(*v*) and 6(*xi*).

Advantages of this arrangement are, compared to immediately providing the step of fusing after the step of depositing radiation absorber, that the increase in temperature to fusing temperature is more gradual by first operating a preheat source L3 after droplet deposition to raise the temperature close to but below the temperature of fusion, before the first radiation source L1 carries out the step of fusion by raising the temperature of the region to be fused further to or above the fusing (melting) temperature. By providing a preheat step between the steps of deposition and fusion, the first radiation source L1 may be operated at a lower energy output. Varying the energy output of the radiation source(s) will be described in more detail later. Such a gentler time distributed energy provision may reduce thermal stresses in the powder layer since temperature differences are reduced, which means the unfused powder remains soft, making the object easier to recover from the unfused powder in the build bed.

Therefore, the provision of one or more further radiation sources, operable to either preheat or fuse as required, allows additional sub steps to improve the control of the thermal cycle that may provide for improved range of the time interval Δt between the steps of fusing and distributing a new layer. These sub steps comprise at least one of:

(a) a post-fuse preheating step between the steps of fusing the regions and distributing a fresh layer of powder;

(b) a second step of fusing between the steps of fusing the regions onto which the radiation absorber has been deposited and distributing a fresh layer of powder over the fused regions;

(c) a second, subsequent step of preheating following the initial step of (post-distribution) preheating of the fresh layer of powder; and (d) a post-deposition preheating step between the steps of depositing the radiation absorber onto the regions of the layer and of fusing the regions of powder.

In the table of FIG. 6, the different arrangements for the various layouts are indicated in the final column with respect to FIGS. 7 to 11. Each arrangement is capable of providing the following method steps while both carriages 30_1 and 30_2 are moving in the first direction across the build area 12. Note that neither the step of lowering the build bed 16 before the return pass of the carriages 30_1, 30_2 from Position 2 to Position 1 (as shown in the flow chart in FIG. 5), nor the step of dosing powder to the work surface 13 ahead of initiating the movement of the second carriage 30_2, is described.

Figure 7:
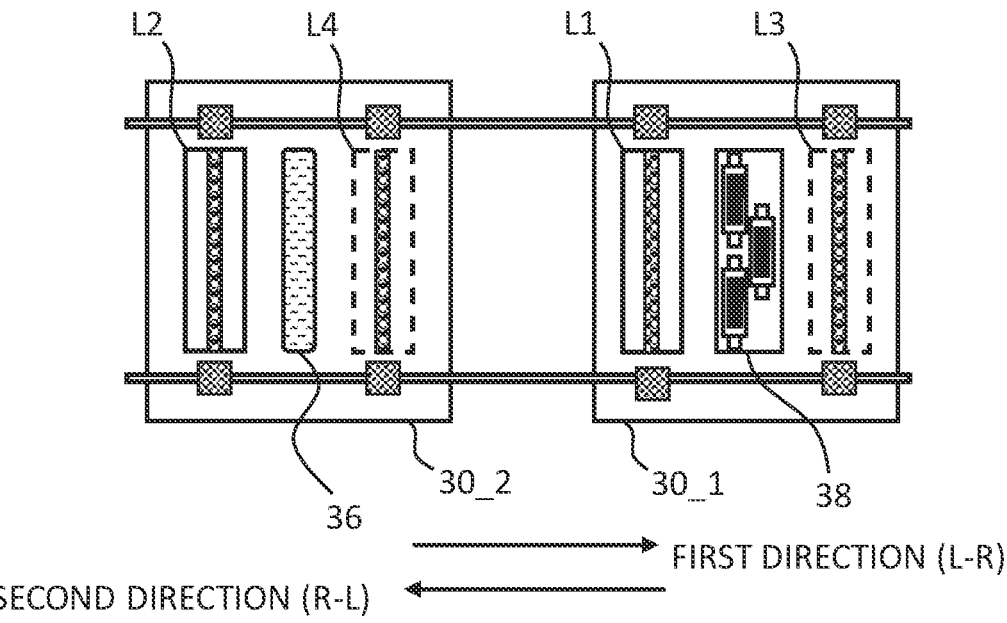
FIG. 7 schematically illustrates a first series of variants of the arrangement of FIG. 4.

FIG. 7 illustrates a carriage arrangement capable of providing in the first direction:

an optional preheating step by the further radiation assembly L3 provided ahead of the droplet deposition unit 38 on the first carriage 30_1;

a step of deposition of radiation absorber using the droplet deposition unit 38;

a fusing step provided by the first radiation assembly L1 following droplet deposition;

an optional post-fuse preheat step provided by a further radiation source L4 provided on the second carriage 30_2 ahead of the powder distributor 36;

a step of distributing a fresh layer of powder across the build area 12 using the powder distributor 36; and a step of post-distribution preheating provided by the second radiation source L2 arranged behind the powder distributor 36.

In other words, up to two preheat steps may be provided following the distribution of the powder, a fusing step and a post-fusing preheating step. As explained before, the preheat step by L3 may be useful in apparatus in which the overhead heater 50 comprises ceramic tiles and the second preheat step provided immediately ahead of the droplet deposition unit 38 provides for a more reactive temperature adjustment than can be provided by the overhead heaters. Similarly, in some apparatus there may be a limitation in the time interval $\Delta t$ due to other system or process limitations. In these cases it might be beneficial to provide a post-fuse preheat step by L4 ahead of the powder distributor 36 to adjust or compensate for system limitations, and so as to extend the range over which the time interval $\Delta t$ may be controlled. For example, in some apparatus, a system time interval may constitute the time it takes for the powder to be delivered to the work surface 13 before the second carriage 30_2 can be moved across the build area 12.

Figure 8:
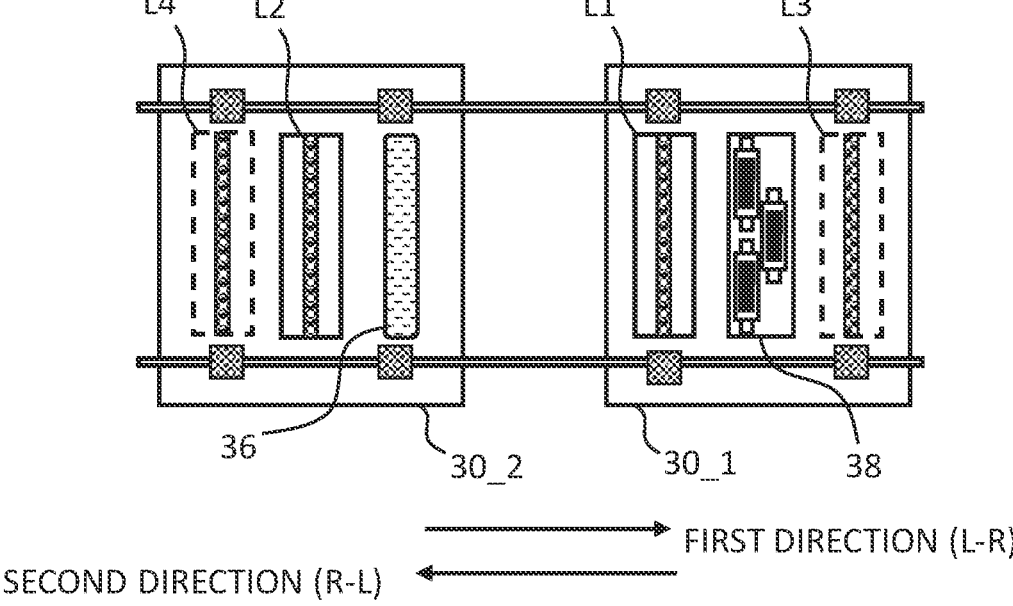
FIG. 8 schematically illustrates a second series of variants of the arrangement of FIG. 4.

FIG. 8 illustrates a carriage arrangement capable of providing in the first direction:

an optional preheating step by the further radiation assembly L3 provided ahead of the droplet deposition unit 38 on the first carriage 30_1;

a step of deposition of radiation absorber using the droplet deposition unit 38;

a fusing step provided by the first radiation assembly L1 following droplet deposition;

a step of distributing a fresh layer of powder across the build area 12 using the powder distributor 36;

a step of post-distribution preheating provided by the second radiation source L2 arranged behind the powder distributor; and an optional second step of preheating provided by the further radiation source L4 arranged behind the second radiation source L2.

This arrangement provides up to three preheating steps of the fresh powder layer in the first direction—two preheat steps immediately after powder distribution by the powder distributor 36, and a further preheat step following the return stroke from Position 2 to Position 1 and immediately ahead of droplet deposition by the droplet deposition unit 38 in the first direction. The same benefit of the optional preheating step by the further radiation assembly L3 as for FIG. 7 applies. The optional second preheat step following the first preheat step by operating two radiation sources L2 and L4 next to one another in a preheat mode extends the duration of preheat immediately following distribution of the fresh layer of powder. In this way the preheat step may be carried out at a shallower ramp; alternatively, the carriages may be moved at an increased second velocity profile $v2(t)$ without having to compromise the amount of preheat energy imparted onto the fresh layer.

Figure 9:
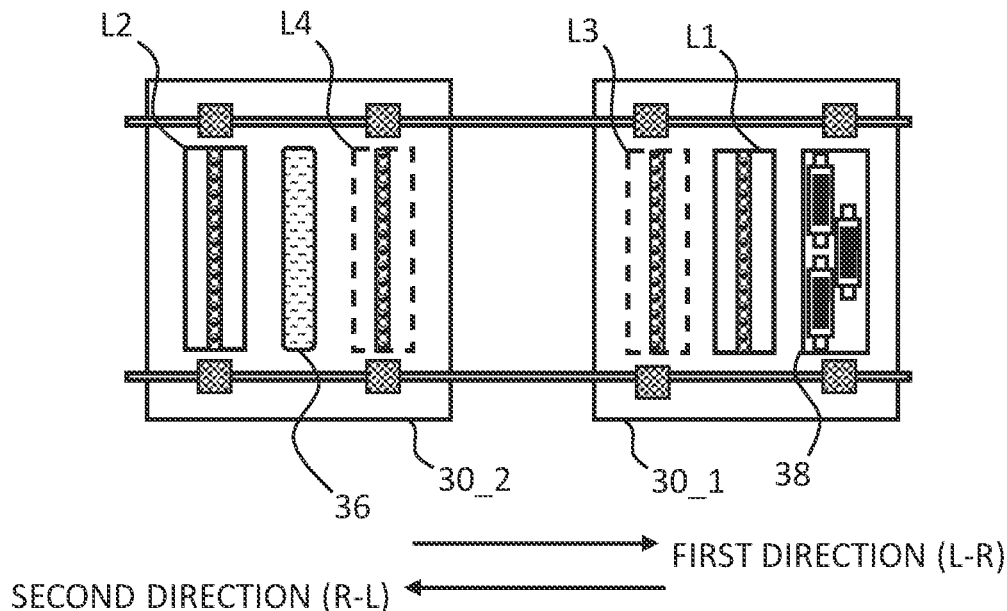
FIG. 9 schematically illustrates a third series of variants of the arrangement of FIG. 4.

FIG. 9 illustrates a carriage arrangement capable of providing in the first direction:

a step of deposition of radiation absorber using the droplet deposition unit 38;

a fusing step provided by the first radiation assembly L1 following droplet deposition;

optionally providing a further radiation assembly L3 on the first carriage 30_1 and following the first radiation assembly L1, wherein the further radiation assembly L3 is operable to:

provide preheating energy to the powder layer so as to provide a post-fuse preheating step following the fuse step and ahead of powder distribution; or provide fusing energy to the fused regions to provide a second fusing step after the first fusing step;

an optional post-fuse preheat step provided by a further radiation source L4 provided on the second carriage 30_2 ahead of the powder distributor 36;

a step of distributing a fresh layer of powder across the build area 12 using the powder distributor 36;

a step of post-distribution preheating provided by the second radiation source L2 arranged behind the powder distributor 36.

This arrangement is capable of providing a sequence that comprises up to two post-fuse preheating steps, or two fusing steps and one post-fuse step. As explained before with respect to the sequence provided by the arrangement of FIG. 7, the post-fuse preheat step by L4 may be useful in apparatus in which the overhead heater 50 comprises ceramic tiles and the second preheat step provided immediately ahead of the droplet deposition unit 38 provides for a more reactive temperature adjustment than can be provided by the overhead heaters. In some apparatus there may be a limitation in the time interval due to other process consideration, and in these cases, it might be beneficial to provide a post-fuse preheat step by L4 ahead of the powder distributor 36 to adjust for system limitations and so as to extend the range over which the time interval $\Delta t$ may be controlled. For example, in some apparatus, a system time interval may constitute the time it takes for the powder to be delivered to the work surface 13 before the second carriage can be moved across the build area 12. Additionally, or instead, in some processes the temperature of the build area 12 needs to be tightly controlled before the step of distribution.

The post-fuse preheat step provided by L3 may be beneficial in processes in which the duration over which the fused areas are kept in molten state is extended before the distribution of the new layer without having to impart a second fusing step.

Provision of a second fusing step may be beneficial in apparatus where the duration of the fusing step is to be extended, while optionally lowering the duty cycle of one or both of the fusing radiation sources L1, L3 so as to avoid overshoot of energy and overheating problems leading to poor surface quality of the object. Alternatively, providing two fusing steps may allow the velocity profile $v1(t)$ of the first carriage 30_1 to be increased for a shorter sequence of steps compared to only providing one fusing step.

Figure 10:
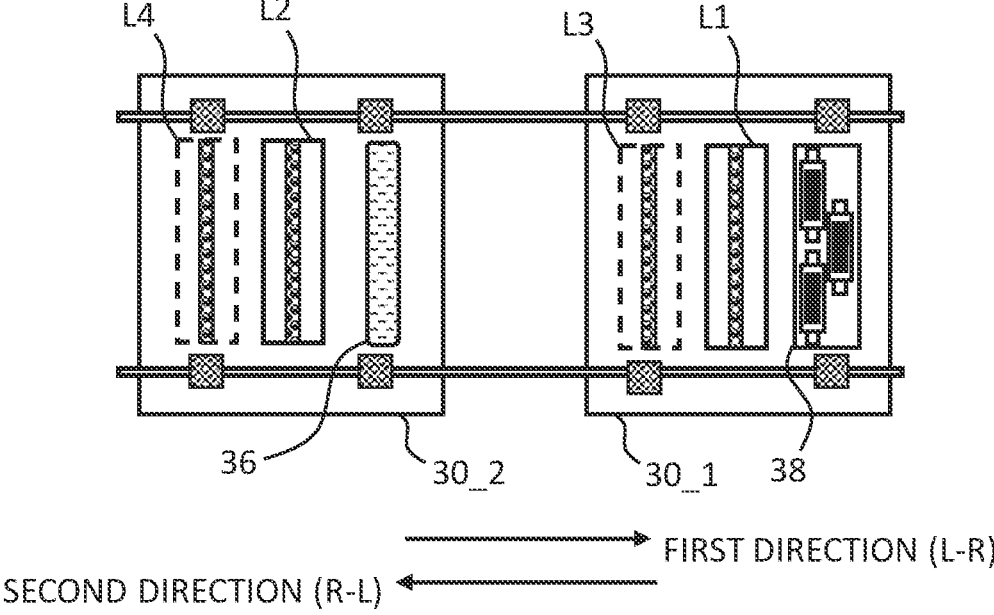
FIG. 10 schematically illustrates a fourth series of variants of the arrangement of FIG. 4.

Considering FIG. 10, this illustrates a carriage arrangement capable of providing in the first direction:

a step of deposition of radiation absorber using the droplet deposition unit 38;

a fusing step provided by the first radiation assembly L1 following droplet deposition;

optionally providing a further radiation assembly L3 on the first carriage 30_1 and following the first radiation assembly L1, wherein the further radiation assembly L3 is operable to:

provide preheating energy to the powder layer so as to provide a post-fuse preheating step following the fuse step and ahead of powder distribution; or provide fusing energy to the fused regions to provide a second fusing step after the first fusing step;

a step of distributing a fresh layer of powder across the build area 12 using the powder distributor 36;

a step of post-distribution preheating provided by the second radiation source L2 arranged behind the powder distributor; and an optional second step of post-distribution preheating provided by the further radiation source L4 arranged behind the second radiation source L2.

This arrangement is capable of providing a sequence that comprises either a second fusing step or a post-fuse preheating step, in combination with one or two post-distribution preheating steps. Regarding the second fusing steps or a post-fuse preheating step, the same benefits described for the same options in FIG. 9 apply. Regarding the option of two post-distribution preheating steps, the same benefits as for the arrangement of FIG. 8, with regard to the second carriage arrangement, apply.

In combination, this arrangement may provide for improved sequence speed in the first direction since by enabling two fusing steps and two (post-distribution) preheat steps, the velocity of both carriages 30_1, 30_2 may be increased without having to compromise either on fusing energy input to the regions comprising radiation absorber or on (post-distribution) preheating energy input imparted to the build area 12 after distributing a fresh layer.

Figure 11:
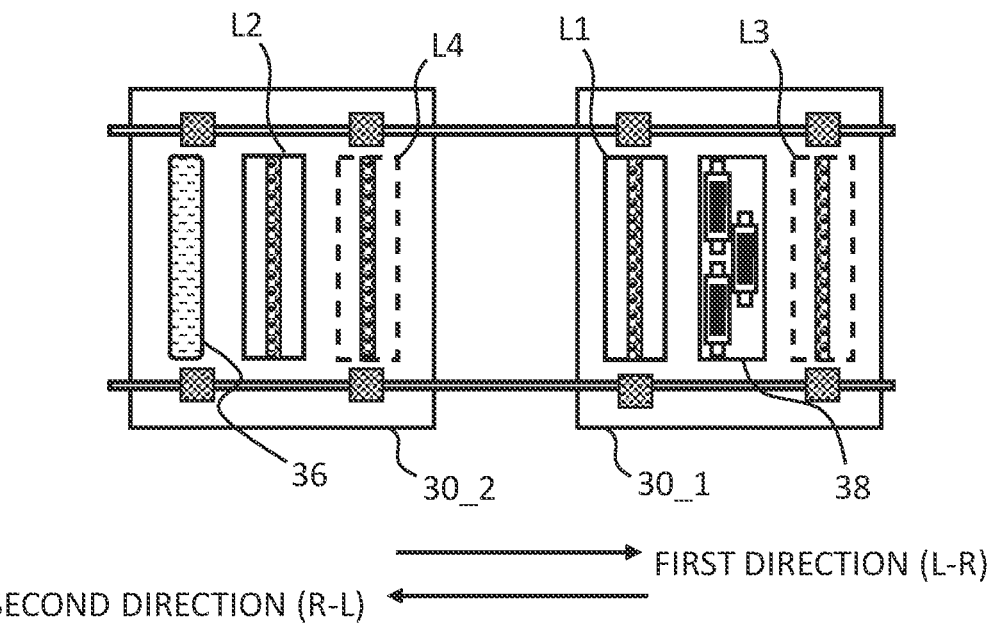
FIG. 11 schematically illustrates a fifth series of variants of the arrangement of FIG. 4.

FIG. 11 illustrates a carriage arrangement capable of providing in the first direction:

an optional preheating step by the further radiation assembly L3 provided ahead of the droplet deposition unit 38 on the first carriage 30_1;

a step of deposition of radiation absorber using the droplet deposition unit 38;

a fusing step provided by the first radiation assembly L1 following droplet deposition;

an optional post-fuse preheat step provided by a further radiation source L4 provided on the second carriage 30_2 ahead of the powder distributor 36;

a further post-fuse preheat step provided by the second radiation source L2 arranged between the powder distributor, and the further radiation assembly L4; and a step of distributing a fresh layer of powder across the build area 12 using the powder distributor 36.

This arrangement is capable of providing a sequence that does not comprise an immediate preheat step following powder distribution. Instead, the preheating step is provided immediately ahead of the step of deposition of radiation absorber. As discussed before with reference to the layout 6(*xv*) in FIG. 6, this arrangement may be particularly suitable for apparatus in which an overhead static heater 50 is provided above the build bed 16, in which the heating element(s) are able to provide a fast response time t0 changes in operating energy. Such an overhead heater would be particularly suited to preheat the freshly distributed layer of powder between the steps of distributing a fresh layer and (after the return stroke of both carriages) before the deposition of radiation absorber. Meanwhile, the one or more post-fuse preheating steps immediately ahead of the powder distribution step may be beneficial in maintaining the fused areas in a suitably molten state to enable sufficient broadening of the interlayer formed between the fused and fresh powder layer. Such an overhead heater 50 may be operated continuously throughout the layer sequence for improved thermal stability of the build bed surface and enhanced quality of the object.

In the above arrangements, the droplet deposition unit 38 is provided on the first carriage 30_1, in the first direction with respect to the first radiation source, such that the first radiation source follows the droplet deposition unit 38 during the movement of the first carriage 30_1 in the first direction. The droplet deposition unit 38 may alternatively be provided on a separate, third, carriage 30_3 independently moveable to the first and second carriage 30_1, 30_2 and also in the first and second directions. This may solve issues with overheating of the droplet deposition unit 38 when in close proximity to a radiation source, and specifically a fusing radiation source. It further allows additional flexibility in the timing between droplet deposition and fusing the regions of the layer.

Figure 12:
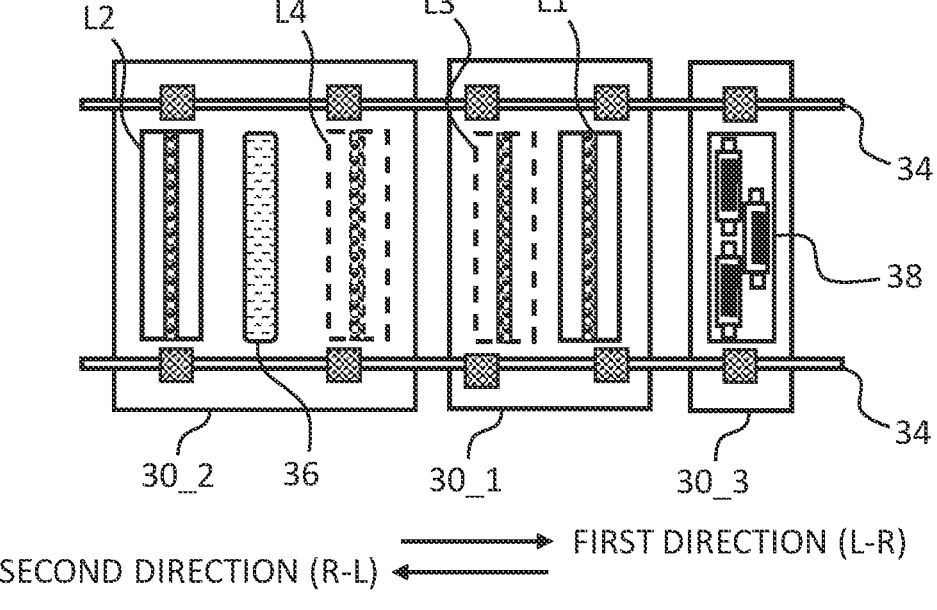
FIG. 12 schematically illustrates an arrangement in which the droplet deposition unit is provided on a third carriage viewed from below.

FIG. 12 shows an alternative arrangement in which the droplet deposition unit 38 is provided on a third carriage 30_3. The arrangement is adoptable as an alternative to any of the previous variant layouts described, while allowing for the same order of arrangement in components along the parallel axis of motion to ensure that at least all steps of high thermal impact are carried out in the same direction.

There is therefore provided an apparatus 1 for layer-by-layer manufacturing a 3D object from a powder arranged to carry out the method and its variants as described herein, the apparatus comprising: a working surface 13, the working surface comprising a build area 12 on which the object 2 is formed layer-by-layer and which comprises a plurality of locations; and a droplet deposition unit 38, a first radiation source L1, a powder distributor 36 and a second radiation source L2 (or L3) operable to move across the working surface 13 in a first direction, and in a second direction opposite to the first direction, to pass over the plurality of locations on the build area 12, wherein: the droplet deposition unit 38 is operable to deposit radiation absorber onto regions on the build area 12 as the droplet deposition unit 38 moves according to a first velocity profile $v1(t)$ in the first direction; the first radiation source L1 is provided in the second direction with respect to the droplet deposition unit 38 (i.e. behind the droplet deposition unit in the first direction) and is operable to fuse the regions on the build area previously deposited with radiation absorber as the first radiation source L1 moves according to a first velocity profile $v1(t)$ in the first direction; the powder distributor 36 is operable to distribute a fresh layer of powder as the powder distributor moves across the build area 12 according to a second velocity profile $v2(t)$ in the first direction; the second radiation source L2 (or L3) is operable to preheat the freshly distributed layer of powder as the second radiation source moves across the build area 12 in the first direction; and wherein the apparatus further comprising a controller 200 arranged to adjust the first and/or second velocity profiles $v1(t), v2(t)$ to control a time interval $\Delta t$ between the passing of the first radiation source L1 and the powder distributor 36 at each of the plurality of locations.

The first radiation source L1 may be provided on a first carriage 30_1; and optionally the powder distributor is also provided on the first (e.g. single) carriage such that $v1(t)=v2(t)$. Alternatively, the powder distributor is provided on a second carriage 30_2.

Furthermore, the second radiation source L2 may be provided on the second carriage 30_2 in the second direction with respect to the powder distributor (behind the powder distributor in the first direction), and optionally a further radiation source operable to preheat the layer of powder may be provided on the second carriage in the second direction with respect to the second radiation source; or, the second radiation source L3 may be provided on the first carriage 30_1 in the first direction with respect to the droplet deposition unit 38, and optionally one or more radiation sources may be provided to the second carriage 30_2 in the first direction with respect to the powder distributor and operable to preheat the fused layer of powder in the first direction; optionally wherein:

(a) a further radiation source operable to preheat the layer of fused powder may be provided on the second carriage in the first direction with respect to the powder distributor in the first direction, or on the first carriage in the second direction with respect to the first radiation source; and/or (b) a further radiation source operable to preheat the layer of fused powder in the first direction may be provided on the first carriage in the first direction with respect to the droplet deposition unit, and optionally also with respect to the first radiation assembly; and/or (c) a further radiation source operable to fuse the layer of fused powder in the first direction may be provided on the first carriage in the first direction with respect to the first radiation assembly.

Next, the controller and further variants of the method will be described in detail.

Controller for and Methods of Control of Time Interval $\Delta t$

A controller 200 is provided to carry out the various methods described above and in combination with controlling the time interval $\Delta t$. Control of the time interval $\Delta t$ may be based on one or more of:

a predetermined time interval $\Delta t$;

the first velocity profile $v1(t)$ and/or the second velocity profile $v2(t)$;

receiving encoder information on the position of the first and second carriages;

receiving information related to thermal profile measurements of the build area 12;

a duty cycle of one of or both the first and second radiation sources L1, L2.

The controller 200 is arranged to receive input data necessary to allow control based on one or more of the above. Specifically, the controller 200 may be arranged to carry out various methods to be able to control the time interval $\Delta t$. Some of these methods may optionally comprise controlling additional components, or properties of components.

For example, the controller 200 may, for all variants of the method, be arranged to adjust, so as to correct and synchronise, the first and second velocity profiles $v1(t)$ and $v2(t)$, by receiving encoder position information of the carriage positions and adjusting at least one of the first and second velocity profiles $v1(t)$ and $v2(t)$ based on position information. This may involve dynamically controlling the first and second velocity profiles based on encoder information of the carriage positions along the build area 12 received from a carriage motion encoder device, where such position information is calibrated against actual position of the one or more carriages 30_1, 30_2 (and any further carriages, where present) over the build area 12. The first and second carriage positions 30_1, 30_2 may generally be converted to reflect the actual positions over the build area 12 of the first radiation assembly and the powder distributor 36 on their respective carriage so as to determine the time interval $\Delta t$ between the thermal events of imparting fusion energy and distributing the fresh layer.

The controller 200 may thus be configured to receive position information from a position encoder device, the position information being related to the actual instantaneous position of the first radiation source L1 and the powder distributor 36 over the build area 12 along the first direction, and to adjust at least one of the first velocity profile $v1(t)$ and the second velocity profile $v2(t)$ based on the position information so as to control the time interval $\Delta t$.

The position encoder may for example detect and report the position of the first and second carriages 30_1, 30_2 over the build area 12. The position of the carriages may be converted to the actual and instantaneous positions of the first radiation source L1 (depending on its location on the first carriage 30_1) and the powder distributor 36 (depending on its position on the second carriage 30_2) during their movement along the first direction. The controller 200 may be configured to determine the actual and instantaneous positions of the first radiation source L1 and the powder distributor 36 itself, or it may receive such information from a separate control device.

The position information may be received continuously during movement in the first direction, and the controller 200 may additionally be configured to continuously adjust the first and second velocity profiles $v1(t)$, $v2(t)$ based on position information of the first radiation source L1 and the powder distributor 36 so as to continuously control the time interval $\Delta t$ during the movement of the first carriage 30_1 and of the second carriage 30_2 in the first direction. This may be necessary in apparatus in which the actual velocity profiles determined from encoder position information require correction at least from time t0 time during movement in the first direction to achieve the desired velocity profiles. Additionally, or instead, the desired velocity profile may be adjusted based on thermal feedback, as will be explained below.

In preferred variants of the method, the first velocity profile may equal the second velocity profile such that $v1(t)=v2(t)$. In other words, the distance between the first radiation source L1 and the powder distributor 36 remains constant during their movement across the build area 12 in the first direction. The encoder position information may be used by the controller 200 to adjust one or both velocity profiles to ensure that the desired velocity profiles remain the same. In some processes, the first velocity profile $v1(t)$ of the first radiation source L1 and/or the second velocity profile $v2(t)$ of the powder distributor 36 may be adjusted during their movement in the first direction based on thermal feedback of the build area 12, such that the time interval $\Delta t$ is adjusted based on thermal feedback of the build area 12 in the first direction. In such sequences, the time interval $\Delta t$ may be continuously adjusted based on thermal feedback. Alternatively, it may be adjusted based on predetermined velocity profiles for each layer, and not be based on in-process thermal feedback. "Continuously" means at such intervals during the movement in the first direction so as to be suitable to sufficiently adjust the velocity during movement of the first radiation source and/or the powder distributor in the first direction so as to adequately control the time interval Δt.

In preferred variants, the controller 200 may be arranged to receive a predetermined time interval, and to adjust the first velocity profile v1(t) of the first radiation source L1 and/or the second velocity profile v2(t) of the powder distributor 36 during their movement in the first direction such that the time interval Δt equals the predetermined time interval. The predetermined time interval may for example be specific to the material and temperature conditions of the particular build process. In some variants of the method, the predetermined time interval may preferably be of the duration of 1 s or less.

The predetermined time interval may be the same for each layer, or it may be different for some or all of the layers, for example based on thermal information pre-determined from layer-by-layer data or determined during the build process based on monitoring build bed temperature.

The first and second velocity profiles may be described by equal and constant velocities during movement of the first radiation source L1 and of the powder distributor 36 in the first direction, so that v1(t)=v2(t)=constant. The controller 200 may thus be configured to adjust the first velocity profile v1(t) and/or the second velocity profile v2(t) such that the time interval Δt remains substantially constant between fusing and distributing a fresh layer at each of the plurality of locations. In some variants it may be the velocity profile of the first and second carriage 30_1, 30_2 that is adjusted across the build area 12 in the first direction. This may involve the controller 200 being arranged to adjust the first and second velocity profiles continuously based on position information of the first and second carriages 30_1, 30_2 so as to ensure that the first and second velocity profiles remain at a constant velocity and equal to one another. In this way, for at least a plurality of locations positioned along the first direction across the build area 12, variations in the degree of interparticle fusion may be reduced or compensated for between the plurality of locations by maintaining a constant time interval Δt throughout the thermal cycle. Preferably, the provision of a constant time interval Δt at all locations of the build area may be used to achieve a uniform degree of interparticle fusion in the fused regions and from layer to layer so as to provide uniform part quality from all locations on the build area.

In some apparatus, a variation in thermal uniformity may exist along the first direction by unintended additional heating effects specific to the apparatus and process. For example, the temperature of the build area 12 may be increasing gradually in the first direction as is known from prior build processes. Such unintended heating effects with a directional component (along the first direction) may be reduced or prevented by compensating accordingly the energy input during the layer sequence. Some methods may therefore use thermal information to predict and/or adjust one or more of the variables that control the energy input into the layer. These include the velocities of the velocity profiles, since a change in velocity alters the duration over which energy may be imparted by the radiation source(s); the energy outputs of the radiation source(s) over the duration of the movement in the first direction; and the degree of radiation absorption provided by the radiation absorber, since a lower density of radiation absorber (provided for example by a lower number of droplets deposited from the droplet deposition unit 38) will lead to a lower absorption of radiation energy and thus a lower thermal input into the fused regions.

Next, methods and advantages of varying the energy output of the radiation source(s) will now be described.

Duty Cycle of Radiation Sources

While the above methods and control therefore provide for an improved balance in thermal impact, and preferably a consistent timing of thermal events on all locations of the build bed 16, local fluctuations in temperature on the build bed 16 may lead to poor uniformity in part quality. For example, a process sequence may lead to specific thermal profiles that indicate a temperature variation of the build area 12 in the process direction. In the methods described herein, a thermal variation may exist along the first direction across the build area 12. Such a thermal variation along the first direction over the build area 12 may be reduced or prevented by adjusting the energy output, e.g. by adjusting the duty cycle, of the moveable radiation sources described herein.

The controller 200 may, for example, control the energy output of the second (preheating) radiation source (or of any or all of further radiation sources operable to preheat), such that the energy output decreases during the movement of the radiation source in the first direction across the build area 12. In this way, the radiation source imparts a decreasing amount of preheat energy to the build area 12 during its operation in the first direction. This may at least in part compensate against an otherwise inherent increasing thermal profile along the first direction of the build area 12. This approach is preferable over adjusting the velocity profiles of the first radiation source L1 and the power distributor 38 (or of the second radiation source L2 or further radiation sources) and/or the time interval Δt (or other time delays between thermal events in the layer sequence), since the dynamic thermal cycle may be kept consistent by keeping respective velocities and time intervals between significant thermal events constant and the same for each layer.

The occurrence of a variation in thermal profile in the first direction may be at least partially compensated for (be reduced or prevented) by applying a predetermined correction every layer or at regular layer intervals. For example, previous processes may empirically show a gradual increase in temperature along the first direction and a predetermined correction ensures a reduction in the increase. Alternatively, the input data defining the object to be printed by defining layer-by-layer the regions onto which radiation absorber is to be deposited ('slice data') may be assessed. Slice data may predict for one or more layers a temperature build up or decrease along the first direction. For one or more of the layers therefore, the occurrence of a variation in thermal profile in the first direction may be reduced or prevented by applying a predetermined recurring correction. Alternatively, or in addition, thermal information may be generated during the process.

In some apparatus, a thermal sensor, such as a thermal camera 70 as indicated in FIG. 1 at the centre of the overhead heater 50, may be arranged above the build area 12, and configured to monitor the temperature of the build area 12 layer-by-layer.

The controller 200 may generally be arranged to receive thermal information generated by a sensor (such as a thermal camera 70) monitoring the temperature of the build area 12, and to adjust an energy output of the first and/or second radiation source during its movement in the first direction based on the thermal information, such that one or more of the energy outputs of the first radiation source L1 and the second radiation source L2 is based on thermal feedback of the build area 12. The controller 200 may be arranged to process the thermal images resulting from monitoring the temperature of the build area 12 to determine the thermal information, or it may simply receive the thermal information from another component of the apparatus. As for velocity control, the controller 200 may be arranged to control the energy output of the radiation sources based on encoder position information of the carriages 30_1, 30_2. The position information of the carriages may be translated to the position information of the first radiation source, the second radiation source, and optionally the third and the fourth radiation source, over the build area 12. The energy output of the various radiation sources may thus be controlled based on thermal feedback of the build area 12 and based on position information of the respective radiation sources over the build area 12 during movement in the first direction.

The thermal information may be provided layer-by-layer and a thermal feedback loop may be applied to control the layer sequence steps based on the thermal information. The thermal information may be acted upon by the controller 200 to reduce a variation in thermal profile for subsequent layers, or to at least partially predict based on knowledge of the thermal development during the process a correction to be applied in advance so as to prevent or reduce the occurrence of a variation in thermal profile for each layer.

The energy input into the layer may therefore be varied to achieve a desired thermal profile in the first direction of the build area 12. The controller 200 may therefore generally be configured to generate (or alternatively be configured to receive) thermal information based on:

> monitoring the temperature of the build area 12 for a plurality of the layers being processed; and/or
> assessing slice data based on which of the regions of each layer are to be provided with radiation absorber; and, based on the thermal information, adjusting for a subsequent layer one or more of:
> the first velocity profile $v1(t)$ of the first radiation source L1 and/or the second velocity profile $v2(t)$ of the powder distributor 36 during their movement in the first direction, such that the energy input to the build area 12 from the first radiation source L1 is adjusted by the adjustment of the first and/or second velocity profile (in preferred variants such that the time interval $\Delta t$ is substantially constant);
> an energy output of the first and/or second radiation source L1, L2 during their or its movement in the first direction; and
> a droplet deposition density during operation of the droplet deposition unit 38 in the first direction so as to adjust the degree of energy absorption of one or more of the regions to be fused.

For example, for an increase in temperature on the build area 12 from left to right, in the first direction, the step of fusing may be carried out at an increasing first velocity so as to balance the energy input on the build area 12 from left to right. At higher velocities, less energy from the radiation sources is imparted to the build area 12, and the regions to be fused, than at lower velocities.

In such cases where from the thermal information a varying thermal profile is determined in the first direction of the build area 12, the controller 200 may be configured to adjust at least one of, during the movement in the first direction, > the first and/or second velocity profile;
> the energy output of the first and/or second radiation source; and
> the density of radiation absorber deposited by the droplet deposition unit 38.

As described above, adjustment may be based on predetermined values or profiles, or may alternatively be based on in-process thermal information, such as by thermal feedback from monitoring the temperature of the build area 12 during each layer sequence.

The varying thermal profile may be an increasing thermal profile in the first direction and the controller 200 may be configured to adjust the first and/or second velocity profile to a substantially increasing velocity profile along the first direction. Additionally, or instead, the controller 200 may be configured to adjust one or both of:

> the energy output of the first and/or second radiation source L1, L2 to a generally decreasing energy profile during movement of the first radiation source L1 and/or the second radiation source L3 in the first direction;
> the density of radiation absorber deposited by the droplet deposition unit 38 such that it is decreased in a region located nearer the end of the movement in the first direction compared to a region located nearer the start of the movement in the first direction.

This may be particularly desirable in preferred variants in which the time interval $\Delta t$ is controlled to remain substantially constant. In some of these preferred variants, the controller 200 is configured to adjust the energy output of the second radiation source (the preheat source) such that the energy input to the build area 12 from the second radiation source L2 is decreased long the first direction, for example by applying a predetermined linearly decreasing energy output to the second radiation source L2. Alternatively, the energy output of the second radiation source L2 (and optionally of the first radiation source L1) may be controlled based on thermal information, and preferably by thermal feedback from monitoring the temperature of the build area 12 during each layer sequence.

In repeated build sequences of the object, the time interval $\Delta t$ may be the same layer-by-layer. Alternatively, especially where feedback control based on thermal information is applied, the controller 200 may be arranged to adjust the time interval $\Delta t$ layer-by-layer based on thermal feedback of the build area 12.

In preferred variants, the time interval $\Delta t$ may be a predetermined, constant time interval. A set of time intervals $\Delta t$ may be predetermined empirically or from slice data against a thermal profile parameter, such as a passing certain low or high temperature threshold and provided to the controller 200. The controller 200 may be configured to:

> receive the set of predetermined values for $\Delta t$;
> receive thermal information based on monitoring the temperature of the build area 12;
> determine, for one or more of the layers monitored, an associated thermal profile parameter;
> determine the predetermined time interval $\Delta t$ from the set of predetermined values for $\Delta t$ for the associated thermal profile parameter; and
> adjust for a subsequent layer of the one or more monitored layers the time interval $\Delta t$ to the predetermined time interval $\Delta t$ from the set of predetermined values.

This may enable the controller 200 to speed up certain process steps to as to shorten the time of the object build and make the process commercially more competitive.

Optionally, the energy output of the first and/or second radiation source L1, L2 may be a predetermined energy profile based on slice data or determined empirically against a thermal profile parameter. In some variants of the method, a set of predetermined energy profile(s) against the thermal profile parameter may be determined and provided to the controller 200. The controller 200 may be configured to:

receive the set of predetermined energy profiles for energy output of the first and/or second radiation source in the first direction; receive thermal information based on monitoring the temperature of the build area 12; determine, for one or more of the layers monitored, an associated thermal profile parameter; determine the predetermined energy profile(s) for the first and/or second radiation source L1, L2 from the set of predetermined energy profile(s) for the associated thermal profile parameter; and adjust for a subsequent layer of the one or more monitored layers the energy profile(s) to the predetermined energy profile(s) for the first and/or second radiation source L1, L2 from the set of predetermined energy profile(s).

In some processes, between build sequences of respective objects to be manufactured, small adjustments in set point of the target temperature of the build area 12 may be necessary. These in turn may necessitate an adjustment in the time interval Δt. With the present solution, it is possible to control the time interval Δt based on a predetermined value or dynamically throughout the process.

In any of the above variants, the time interval Δt may be determined or chosen such that the movement of the second carriage 30_2 is initiated before the first carriage 30_1 has passed the build area 12 (before the step of fusing along the first direction is complete). Where thermal feedback is present, the controller 200 may be arranged to receive thermal information and a threshold thermal information, wherein the controller 200 is arranged to compare the received thermal information to the threshold thermal information, and to initiate the distribution of the fresh layer of the powder as a result of the determining that the received thermal information equals the threshold thermal information. In other words, the controller 200 is arranged to initiate the distribution of the fresh layer based on a measured temperature of the build area 12. The threshold information may be a minimum temperature of one or more of the fused regions at which the movement of the second carriage 30_2 is to be initiated, so as to ensure a controlled time interval Δt between fusing and distributing the fresh layer that ensures sufficient interfacial broadening between the molten regions and the fresh layer to achieve adequate part quality such as mechanical strength along the layering direction, z.

General Points

In the above methods, the thermal uniformity is improved by providing at least the steps of fusing regions onto which radiation absorber has been deposited, and distribution of a fresh layer, in the same direction, and by controlling the time interval Δt between the steps of fusing and distributing a fresh layer of powder such that for a plurality of locations on the build bed located along the first direction, variations in the thermal cycle may be reduced or compensated for between the plurality of locations. This improves thermal uniformity of the process across the build area and reduces or prevents differences in the degree of interparticle fusion within the fused regions and from layer to layer, thus reducing or preventing variability in the mechanical strength of objects build at different locations in the build bed. The energy per unit area input into the build area for each layer sequence may also be made uniform. Preferred methods are those in which the time interval Δt remains constant. In this way, durations of all steps of the thermal cycle remain the same for all locations of the build area 12. Furthermore, the respective time intervals between the initiation of the various sequential steps in the layer sequence may be constant time intervals, such that the duration of time over which the layer sequence is applied is the same duration for each layer. In addition, it is preferable that the same step is initiated after the same delay from layer to layer—for example for each layer, the step of distributing the layer occurs after the same period of time from distributing the previous layer. It should be noted that the described 'layer sequence' may be defined from any starting point of the layer steps, for example by the arrangement of sequential movement of the carriages and their modules. Thermal variations along the first direction may optionally be corrected by accordingly adjusting the energy output of at least one of the first and/or second radiation sources L1, L2 and/or the first and second velocity profiles (both being the same) and/or the droplet deposition density during operation of the droplet deposition unit 38 in the first direction so as to adjust the energy absorption of one or more of the regions to be fused. In preferred methods, furthermore, a preheat delay between the powder distributor and the second radiation source L2 (preheating source) passing each of the plurality of locations remains substantially constant at each of the plurality of locations. In addition, the movement of the third or further radiation source (L3, L4), where independently moveable, may be controlled such that secondary time intervals between the third or further radiation source and one or more of the first radiation source L1, the powder distributor 36 and the second radiation source L2 passing each of the plurality of locations remain substantially constant at each of the plurality of locations.

In all variants of the apparatus discussed, the droplet deposition unit 38 may alternatively be provided on a third carriage 30_3 as illustrated in FIG. 11. In that case the further radiation source L3 may be provided on the first carriage 30_1 alongside the first radiation source L1, or it may be provided on the third carriage 30_3, to one of the sides of the droplet deposition unit 38 as required in order to fulfil its function.

For example, where the further radiation source L3 is provided in the first direction with respect to the droplet deposition unit 38, the further radiation source L3 is operable to preheat and not to fuse in the first direction. In the table of FIG. 6, this is illustrated by layouts 7(*xi*) to 7(*xiv*). In these variants, as explained above with respect to FIG. 5, by providing a third radiation source (L3) ahead of the droplet deposition unit 38 during movement in the first direction and operable to preheat, the third radiation source L3 may be used to address the slow response time by complementing the effect of the overhead heater 50.

The powder may be, or may comprise, a thermoplastic polymeric material such as PA11, PA12, PA6, polypropylene (PP), polyurethane or other polymers. The examples of "powder" material are not limited to these, and any suitable material known in the art that may be utilized to build a 3D object may be used. The powder may be supplied to the dosing module 40 from a powder reservoir (not shown); different configurations are possible and not discussed here.

The first, second, third and fourth radiation source are electromagnetic radiation sources such as infrared radiation sources that may comprise halogen lamps, either in the form of modular sources or a full width single bulb (e.g. in the form of an elongate bar heater) or a series of sources arranged to span the build area 12; or arrays of radiation sources such as light-emitting infrared diodes (LEDs). The spectrum of emission to enable to fuse a region with radiation absorber depends on the radiation absorber; for example, a carbon black absorber will strongly absorb in the near infrared, for example having a spectrum from 0.5 um to 2 um, with a peak of around 1 um. It may be understood that the radiation absorbing "fluid" may be the radiation absorbing material, or the fluid may be a carrier for a radiation absorbing material, such as a powder. The droplet deposition unit may thus be capable to deposit liquid matter or particulate matter.

For a radiation source to be capable of preheating the fresh powder (powder without radiation absorber), the radiation source may emit in the mid to far infrared within a spectrum from around 2 μm to 8 μm for example, or it may cause a suitable warming effect on the fresh powder in the near infrared. In some variants, the first and second radiation sources L1 and L2 may be identical but operated to a different power output, for example by controlling the duty cycle of the radiation source so as to provide a reduced power output.

An overhead radiation source (heater) 50 may be provided above the build area 12 to provide a uniform temperature on the surface of the build area 12. The overhead radiation source 50 may be a fixed infrared radiation source assembly, such as one or more ceramic IR lamps or halogen lamps or any other suitable radiation sources.

Although the powder dosing module 40 is shown in FIG. 1 as being positioned below the work surface 13, powder dosing module 40 may alternatively be located above the work surface 13 and may be gravity fed. In the event that the powder dosing module 40 is above the work surface 13, the powder distributor 36 may be arranged to store the powder received from the powder dosing module so that the powder distributor 36 distributes the powder through a slot as it passes over the build bed. Alternatively, the powder distributor may be a non-contact device having a container to store powder and one or more outlets to distribute the layer of powder.

It should be noted that the order of the carriages may be reversed to apply the described methods herein to provide a sequence for a single layer: the powder distributor (for example by being provided on the second carriage 30_2) may move ahead of the first radiation source L1 (for example by being provided on the first carriage 30_1) so that the new powder layer is distributed and preheated, and the droplet deposition unit 38 and the first radiation source L1 follow the powder distributor 36 and preheat source L2 in the first direction to deposit radiation absorber onto regions to be fused and apply radiation energy from the first radiation source L1 so as to fuse the regions. This arrangement means that at the end of the layer sequence, both carriages first need to return to the starting position before a subsequent fresh layer of powder can be distributed. The return movement of the carriages presents an increased minimum time interval Δt compared to the sequence generally described herein, where the minimum time interval Δt is defined by the minimum distance achievable between the first radiation source and the powder distributor following it. No return movement is necessary. The increased minimum time interval Δt may be beneficial to achieve sufficient interlayer strength for e.g. viscous materials like amorphous plastics. In addition, the time delay between distribution and fusing (in the same layer) is relatively short (as defined by the distance between the distributor and the first radiation source following it), which may reduce thermal stresses and warping of fused regions.

On the other hand, a greater flexibility in the control over the time interval Δt towards shorter time intervals may be achievable by the powder distributor 36 following the first radiation source L1, as generally described herein.

Furthermore, the illustration of the sequences herein should be interpreted broadly as illustrating the movement of the first radiation source L1 by the first carriage movement and the powder distributor movement by the movement of the second carriage 30_2, and the second radiation source L2 by the movement of the second carriage etc. In principle these components may all be independently moveable on separate carriages, or some may share a carriage.

Figure 13:
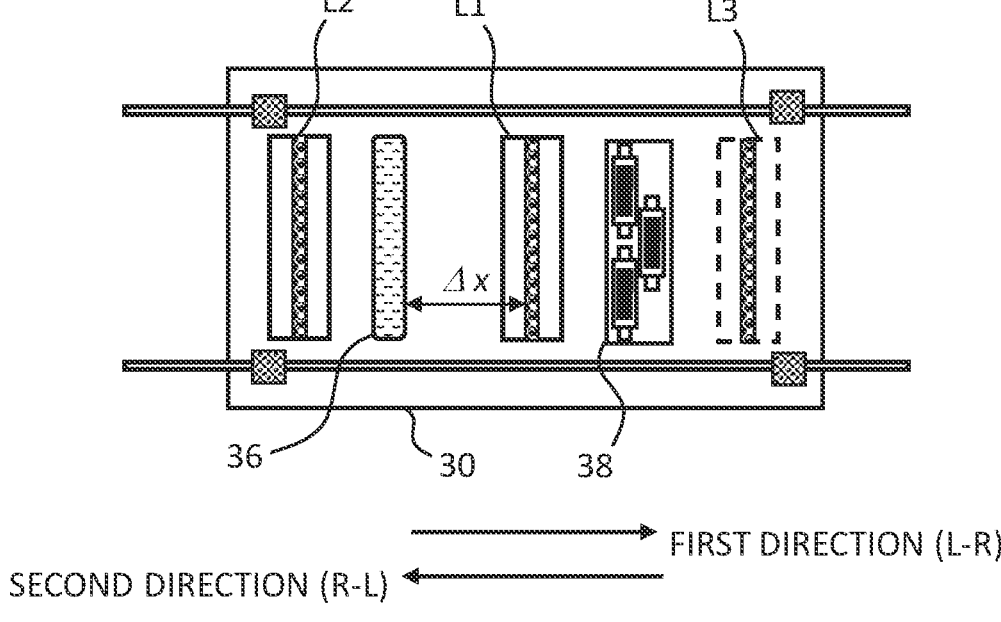
FIG. 13 schematically illustrates an arrangement of a first radiation source and a powder distributor on a single carriage as viewed from below.

In the case of all components being provided on a single carriage, a fixed distance between each adjacent component defines for example for a constant velocity the time interval Δt. An example of an arrangement with a single carriage 30 is shown in FIG. 13, in which the first radiation source L1 is provided between the powder distributor 36 and the droplet deposition unit 38. Optionally, a third radiation source L3 may be provided, here shown to the other side of the droplet deposition unit 38. Alternatively, or additionally, a further radiation source may be provided following the preheat source, or following the first radiation source L1 and leading the powder distributor 36, during movement in the first direction. The time interval Δt is defined by the distance Δx as indicated between the first radiation source and the powder distributor 36 and may be varied either dynamically by adjusting the carriage velocity v1=v2, and/or by manually or electronically adjusting the distance Δx, thereby adjusting the time interval Δt with respect to a fixed velocity v of the carriage 30 during its movement in the first direction. For example, the first radiation source may be provided one or two secondary rail(s) fixed to the carriage 30 and parallel to the first set of rails 34. The first radiation source L1 may be moveable on the secondary set of rails so as to adjust Δx from layer to layer or dynamically within the layer.

As described above, the order of components on the single carriage 30 may be swapped, such that the powder distributor 36 leads the movement in the first direction followed by, in that order, the second radiation source L2, the droplet deposition unit 38, and the first radiation source L1.

It will be clear to one skilled in the art that many improvements and modifications can be made to the foregoing exemplary embodiments without departing from the scope of the present disclosure.

The invention claimed is:

1. A method for layer-by-layer manufacturing of a three-dimensional object from a powder, wherein a droplet deposition unit, a first radiation source, a powder distributor and a second radiation source are moveably provided over a working surface, the working surface including a build area on which the object is formed layer-by-layer, the method comprising, in a first direction across a plurality of locations on the build area:
   (a) moving the droplet deposition unit and depositing, by the droplet deposition unit, a radiation absorber onto regions of a previously applied layer of powder distributed across the build area;
   (b) moving the first radiation source according to a first velocity profile whilst activating the first radiation source to apply fusing energy to the build area to fuse the regions of powder where the absorber has been deposited;
   (c) moving the powder distributor according to a second velocity profile whilst distributing a fresh layer of powder over the build area; and
   (d) moving the second radiation source whilst activating the second radiation source to apply energy to preheat the fresh layer of powder;
   wherein the steps (a) to (d) form a layer sequence, and wherein the layer sequence is repeated to form each layer of the object until the object is complete; and wherein the layer sequence comprises:

adjusting the first and/or second velocity profiles at respective steps (b) and (c) to control a time interval $\Delta t$ between moving of the first radiation source and moving the powder distributor over each of the plurality of locations, and initiating step (c) before step (b) is complete, wherein the first and second velocity profiles are constant and equal velocities, and further wherein:

the time interval $\Delta t$ is the same for each layer;

a second time interval between the passing of the powder distributor and the passing of the first radiation source in the first direction over a build bed surface is the same for each layer; and respective return time intervals over which each of the droplet deposition unit, the first radiation source, the second radiation source and the powder distributor are moved along the second direction opposite the first direction are the same for each layer;

such that the respective periods of time from layer to layer defined by the initiation of the steps (b) of fusing the regions of powder in adjacent layers and of the steps (c) of distributing a fresh layer of adjacent layers is the same for each layer.

2. The method of claim 1, further comprising one or more steps of:

(e) a post-fuse preheating step between steps (b) and (c) of fusing the regions and distributing a fresh layer of powder;

(f) a second step of fusing between steps (b) and (c) of fusing the regions and distributing a fresh layer of powder;

(g) a second step of preheating following step (d) of preheating the fresh layer of powder; and (h) a post-deposition preheating step between steps (a) of depositing a radiation absorber onto the regions of the layer and (b) of fusing the regions of powder.

3. The method of claim 1, further comprising a post-fuse preheating step (e) between steps (b) and (c) of fusing the regions and distributing a fresh layer of powder, wherein the first radiation source is provided on a first carriage and the powder distributor is provided on a second carriage, the first carriage and the second carriage being independently movable relative to one another to move across a working surface, such that the first carriage moves according to the first velocity profile and the second carriage moves according to the second velocity profile, wherein each post-fuse preheating step (e) is carried out by at least one of:

(i) operating a third radiation source, operable to preheat the layer, while moving the first carriage in the first direction across the build area, wherein the third radiation source is provided on the first carriage ahead of the first radiation source in a second direction; and (ii) operating a further radiation source, operable to preheat the layer, while moving the second carriage in the first direction across the build area, wherein the further radiation source is provided on the second carriage ahead of the powder distributor in the first direction.

4. The method of claim 1, further comprising a second step (f) of fusing between steps (b) and (c) of fusing the regions and distributing a fresh layer of powder, wherein the first radiation source is provided on a first carriage and the powder distributor is provided on a second carriage, the first carriage and the second carriage being independently movable relative to one another to move across a working surface, such that the first carriage moves at the first velocity profile and the second carriage moves at the second velocity profile, wherein the second fusing step (f) is carried out by operating a further radiation source, operable to provide fusing energy to the regions fused by the first radiation source, while moving the first carriage in the first direction across the build area, wherein the further radiation source is provided on the first carriage in the second direction with respect to the first radiation source.

5. The method of claim 1, further comprising a second step (g) of preheating following step (d) of preheating the fresh layer of powder, wherein the second radiation source is provided on the second carriage, in the second direction with respect to the powder distributor, such that the second radiation source follows the powder distributor during the movement of the second carriage in the first direction at the second velocity profile, and wherein one or more of second preheating steps (g) is carried out by at least one of:

(i) operating a third radiation source while moving the first carriage in the first direction across the build area, wherein the third radiation source is provided on the first carriage in the first direction with respect to the droplet deposition unit; and (ii) operating a further radiation source while moving the second carriage in the first direction across the build area such that the further radiation source follows the second radiation source, wherein the further radiation source is provided on the second carriage in the second direction with respect to the second radiation source.

6. The method of claim 1, wherein controlling the time interval $\Delta t$ further comprises:

receiving position information from a position encoder device, the position information being related to the position of the first radiation source and the powder distributor over the build area along the first direction; and adjusting at least one of the first velocity profile and the second velocity profile based on the position information so as to control the time interval $\Delta t$.

7. The method of claim 6, wherein the first and second velocity profiles $v1(t)$, $v2(t)$ are continuously adjusted based on position information of the first radiation source and the powder distributor so as to continuously control the time interval $\Delta t$ during the movement of the first radiation source and the powder distributor in the first direction.

8. The method of claim 1, wherein the first velocity profile equals the second velocity profile such that $v1(t)=v2(t)$.

9. The method of claim 1, wherein the first velocity profile $v1(t)$ and/or the second velocity profile $v2(t)$ is adjusted such that the time interval $\Delta t$ remains constant between fusing and distributing a fresh layer at each of the plurality of locations.

10. The method of claim 1, further comprising receiving a predetermined time interval of Is or less, and wherein controlling the time interval $\Delta t$ comprises adjusting the velocity profile of the first radiation source and/or the powder distributor during their movement in the first direction such that the time interval $\Delta t$ equals the predetermined time interval.

11. The method of claim 1, further wherein during step (d), a third velocity profile of the second heat source is the same as the first and second velocity profiles; and wherein a preheat delay between the step (c) of passing the powder distributor and step (d) of passing the second radiation source in the first direction remains constant at each of the plurality of locations; and wherein the preheat delay is the same for each layer.

12. The method of claim 1, wherein a fuse delay between the step (d) of the passing of the second radiation source in the first direction and the subsequent step (b) of passing the first radiation source in the first direction remains constant at each of the plurality of locations; and wherein the fuse delay is the same for each layer.

13. The method of claim 1, further comprising:

providing a set of predetermined energy profile(s) for energy output of the first and/or second radiation source in the first direction against a or the thermal profile parameter;

receiving thermal information based on monitoring a temperature of the build area;

determining, for one or more of the layers monitored, an associated thermal profile parameter;

determining the predetermined energy profile(s) for the first and/or second radiation source from the set of predetermined energy profile(s) for the associated thermal profile parameter; and adjusting for a subsequent layer of the one or more monitored layers the energy profile(s) to the predetermined energy profile(s) for the first and/or second radiation source from the set of predetermined energy profile(s).

14. The method of claim 1, wherein secondary time intervals between a third radiation source and one or more of the first radiation source, the powder distributor and the second radiation source moving over each of the plurality of locations remains constant at each of the plurality of locations, wherein the third radiation source is operable to preheat the layer of powder or to provide fusing energy to the regions fused by the first radiation source.

15. The method of claim 1, wherein the first and second radiation sources are operated continuously while passing the build bed surface, so as to apply energy to the entire build bed surface along the first direction, wherein the energy output of the first and/or second radiation source is varied based on position information of the respective radiation sources over the build area during movement in the first direction.

16. The method of claim 1, wherein the method further comprises preheating a build bed by continuously operating throughout the layer sequence an overhead heat source arranged stationary above the build area.

17. An apparatus for layer-by-layer manufacturing a three-dimensional object from a powder, the apparatus comprising:

a working surface, the working surface comprising a build area on which the object is formed layer-by-layer; and a droplet deposition unit, a first radiation source, a powder distributor and a second radiation source operable to move across the working surface in a first direction, and in a second direction opposite to the first direction, to pass over a plurality of locations on the build area, and a controller, wherein the first radiation source is provided in the second direction with respect to the droplet deposition unit;

wherein:

the droplet deposition unit is operable to deposit radiation absorber onto regions on the build area whilst moving across a build bed according to a first velocity profile v1(t) in the first direction;

the first radiation source is operable to fuse the regions on the build area previously deposited with radiation absorber whilst the first radiation source moving across the build bed according to the first velocity profile v1(t) in the first direction;

the powder distributor is operable to distribute a fresh layer of powder as the powder distributor whilst moving across the build area according to a second velocity profile v2(t) in the first direction; and the second radiation source is operable to preheat the freshly distributed layer of powder as the second radiation source whilst moving across the build area in the first direction;

wherein the controller is arranged to control the moving of the first and second radiation source and of the powder distributor so as to adjust the first and/or second velocity profiles and to control a time interval $\Delta t$ between the moving the first radiation source and moving the powder distributor over each of the plurality of locations, and such that:

the time interval $\Delta t$ is the same for each layer;

a second time interval between the passing of the powder distributor and the passing of the first radiation source in the first direction over the build bed surface is the same for each layer; and respective return time intervals over which each one of the droplet deposition unit, the first radiation source, the second radiation source and the power distributor are moved along the second direction opposite the first direction are the same for each layer;

such that the time interval $\Delta t$ is the same for each layer and such that respective return time intervals over which each of the droplet deposition unit, the first radiation source, the second radiation source and the power distributor are moved along the second direction opposite the first direction are the same for each layer;

wherein a powder distributor is controlled to distribute a fresh layer of powder before the first radiation source has completed its movement over the build area along the first direction.

18. The apparatus of claim 17, further comprising:

a thermal sensor arranged to measure a temperature of the build area, and an overhead heater arranged to heat the build area, wherein the overhead heater is arranged stationary above the build area and configured to preheat the build area, wherein the controller is arranged to control the overhead heater to continuously heat each layer.

19. The apparatus of claim 17, wherein the controller is configured to vary energy output of the first and/or second radiation source based on position information of the respective radiation sources over the build area along the first direction.

* * * * *